United States Patent [19]

Tsudaka

[11] Patent Number: 4,501,485
[45] Date of Patent: Feb. 26, 1985

[54] CARD-OPERATED COPYING MACHINE

[75] Inventor: Hideaki Tsudaka, Osaka, Japan

[73] Assignee: Mita Industrial Company Limited, Osaka, Japan

[21] Appl. No.: 486,541

[22] Filed: Apr. 19, 1983

[30] Foreign Application Priority Data

Apr. 19, 1982 [JP] Japan .................................. 57-65624
Apr. 30, 1982 [JP] Japan .................................. 57-74263

[51] Int. Cl.³ .......................................... G03G 15/00
[52] U.S. Cl. .................................... 355/6; 355/14 C; 355/14 CU; 235/375
[58] Field of Search .......... 355/6, 14 R, 14 C, 14 CU; 235/375, 380, 382, 382.5

[56] References Cited

U.S. PATENT DOCUMENTS

| | | | |
|---|---|---|---|
| 3,872,282 | 3/1975 | Long | 355/14 CU |
| 3,917,924 | 11/1975 | Linne | 355/6 X |
| 3,997,873 | 12/1976 | Thornton | 355/6 |
| 4,102,492 | 7/1978 | Gold et al. | 235/375 |

FOREIGN PATENT DOCUMENTS 44523  4/1979  Japan ................................. 355/6

Primary Examiner—R. L. Moses
Attorney, Agent, or Firm—Wenderoth, Lind & Ponack

[57] ABSTRACT

A card-operated copying machine allows copying operation in response to insertion of one, at a time, of key checking cards for supervising copy counts for a plurality of sections. The card-operated copying machine includes (a) key checking cards assigned respectively to the sections, (b) a processor for issuing a signal capable of copying operation, the processor having a random-access memory for storing total copy counts respectively for the sections with flags indicative of permission and inhibition of copying operation, (c) a copy count display for reading the data stored in the random-access memory and displaying the total copy count for each section, and (d) an inhibition card recording thereon information for setting the flags to an inhibition state. The copying operation is permitted and inhibited in response to the flag conditions.

7 Claims, 24 Drawing Figures

Fig. 7

| | 57 | 56 |
|---|---|---|
| (1) | | ErrOr |
| (2) | A | CLEAr |
| (3) | | End |
| (4) | | Auto |
| (5) | | HAnd |
| (6) | | Print |
| (7) | P | CLEAr |
| (8) | | bAn |

CARD-OPERATED COPYING MACHINE

BACKGROUND OF THE INVENTION

1. Field of the Invention

The present invention relates to a card-operated copying machine, and more particularly to a copying machine operable to allow copying operation on the insertion of a key checking card in order to keep a record of the number of copies taken in each of a plurality of office sections or divisions.

2. Description of the Prior Art

One conventional way to keep records of how many copies have been taken in a plurality of office sections or divisions has been to assign copy counter units to the respective stations, and mount the copy counter unit for each section on a copying machine to enable the copy counter unit to count the number of copies taken. When clearing the total copy counts for all sections, it has been necessary to gather all of the copy counter units and clear the counts in the copy counter units. This is an independent supervising item to be processed. For totaling the numbers of copies made in all sections, another supervising item is required to gather the copy counter units and total the counts. This prior supervising method has suffered from various shortcomings. It is possible to run the copying machine in one section with a counter unit given to another section. When the counter unit in a section has been lost, it has been impossible to inhibit copying operation in that section, and the supervising item to total the copies taken in all sections could not be carried out. The conventional method includes other supervising items, and each such item has been complex and inconvenient to perform.

Various efforts have been made to eliminate the complexity of totaling copies with the copy counter units. One such prior proposal is the use of cards with section codes recorded respectively thereon, the cards being given to respective sections. The card enables the counter in the copying machine to count copies taken in each section. This known method however has failed to prevent personnel in one section from using a lost card belonging to another section for copying operation. According to another prior attempt, cards with supervising item codes recorded respectively thereon have been used to process the supervising items. This process is troublesome in that cards need to be changed each time a particular supervising item is to be processed.

SUMMARY OF THE INVENTION

Accordingly, it is an object of the present invention to provide a card-operated copying machine which eliminates the foregoing prior problems and is capable of inhibiting copying operation in any desired office section.

Still another object of the present invention is to provide a card-operated copying machine capable of processing a plurality of different supervising items with the use of a single card.

The above objects can be achieved by a card-operated copying machine including key checking cards assigned respectively to the sections, a processor for issuing a signal capable of copying operation, the processor having a random-access memory for storing total copy counts respectively for the sections with flags indicative of permission and inhibition of copying operation, a copy count display for reading the data stored in the random-access memory and displaying the total copy count for each section, and an inhibition card recording thereon information for setting the flags to an inhibition state. The copying operation is permitted and inhibited in response to the flag conditions.

With the arrangement of the invention, the copying operation for any desired section can be inhibited by using the inhibition card. Even if a key checking card belonging to one section is used by unauthorized personnel in another section, no copying operation is allowed for the latter section. Therefore, copy counts for the respective sections can be supervised strictly.

According to another preferred embodiment, a card-operated copying machine comprises key checking cards assigned respectively to the sections, a processor for issuing a signal capable of copying operation, the processor having a random-access memory for storing total copy counts respectively for the sections, a copy count display for reading the data stored in the random-access memory and displaying the total copy count for each section, a master checking card for processing a plurality of supervising items, and a switch for selecting the supervising items, the processor being responsive to the master checking card for processing a supervising item selected by the switch.

By actuating the switch with the master checking card used, the plurality of supervising items can be processed easily without suffering from the complexity of processing in each of the supervising items and throughout them.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 7 is illustrative of a variety of indications displayed on the copy supervising unit;

DETAILED DESCRIPTION OF THE PREFERRED EMBODIMENT

Figure 1:
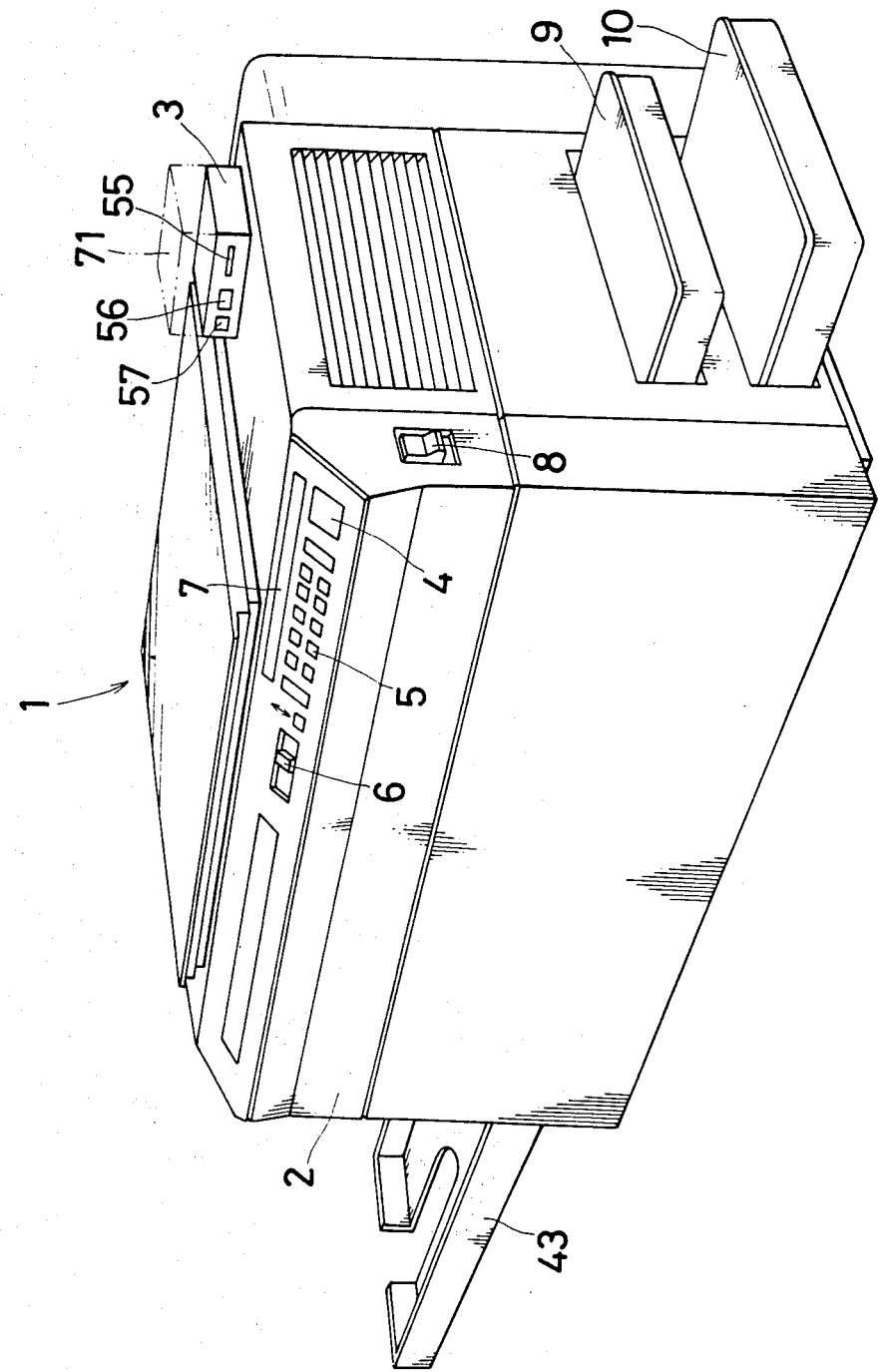
FIG. 1 is a perspective view of an electrostatic copying machine according to the present invention.

As illustrated in FIG. 1, an electrostatic copying machine 1 generally comprises a copying machine body 2 and a copy supervising unit 3 mounted thereon. The copying machine body 2 has on its upper front surface a print button 4 to be depressed for initiating copying operation, ten keys 5 for setting the number of copy or copies to be taken, a density adjustment knob 6, and a display 7. The copying machine body 2 also has a power supply button 8 on a side thereof.

Figure 2:
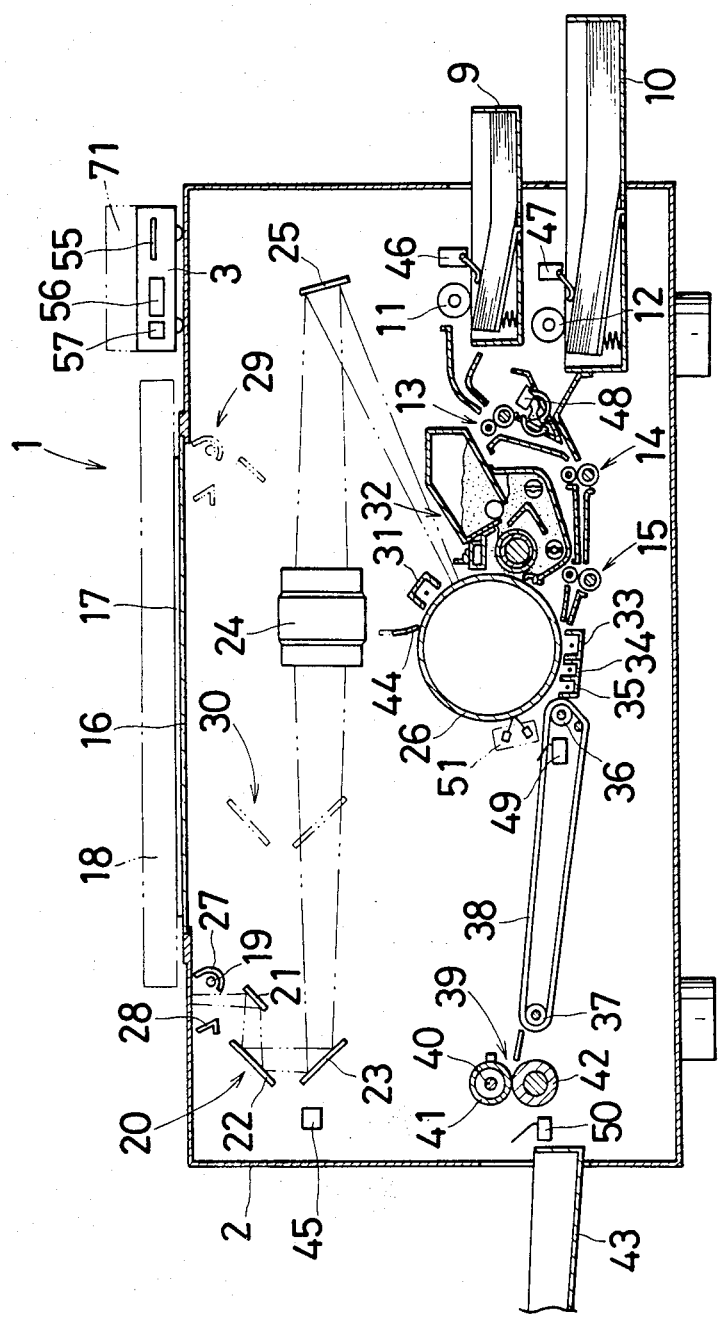
FIG. 2 is a vertical cross-sectional view of the copying machine shown in FIG. 1.

FIG. 2 shows the copying machine 1 in vertical cross section. Cassettes 9, 10 are mounted on the side of the copying machine body 2 and contain stacks of copying sheets having different sizes and fed by feed rollers 11, 12. The copying sheets in the cassettes 9,10 are selectively fed one at a time by transport rollers 13,14,15. The copying machine body 2 includes a horizontal transparent plate 16 mounted on the top thereof for placing an original 17 which is held intimately against the transparent plate 16 by a presser plate 18. The original 17 to be copied is illuminated via the transparent plate 16 by an exposure lamp 19 movably disposed in the copying machine body 2. An image of the original 17 is formed on a photosensitive drum 26 through reflecting mirrors 21, 22, 23, a lens 24 and a reflecting mirror 25. These mirrors and lens cooperate with the exposure lamp 19 in constituting an optical system 20. The exposure lamp 19 is associated with reflecting mirrors 27, 28 for guiding light from the exposure lamp 19.

For exposure, the exposure lamp 19 and the reflecting mirrors 21, 27, 28 is moved from a rest position shown by the solid lines to a position 29 indicated by the imaginary lines. After the original 17 has been exposed, the exposure lamp 19 and the reflecting mirrors 21, 27, 28 return back to the rest position. The exposure lamp and reflecting mirrors travel at a speed twice the speed of movement of the reflecting mirrors 22, 23. Therefore, when the exposure lamp 19 and the reflecting mirrors 21, 27, 28 are in the position 29, the reflecting mirrors 22, 23 are in a position 30 shown by the imaginary lines.

The photosensitive drum 26 is charged by a corona discharger 31. When an image of the original 17 is focused on the charged photosensitive drum 26, a corresponding electrostatic latent image is formed on the photosensitive drum 26. The electrostatic latent image is then visualized as a toner image by a developing unit 32. The toner image is transferred by a corona discharger 33 onto a sheet of copying paper fed from the feed rollers 15. The sheet of copying paper with the toner image thereon is reliably peeled off from the photosensitive drum 26 by charge removers 34, 35. The sheet of copying paper thus peeled off is then fed along by an endless feed belt 38 trained around rollers 36, 37 to a thermal fixation unit 39. The thermal fixation unit 39 comprises a thermal roller 41 with a heater 40 contained therein and a presser roller 42 pressed against the thermal roller 41. Upon travel of the copy sheet between the rollers 41, 42, the toner on the sheet is melted and fixed to the sheet. The sheet with the fixed toner image is discharged into a tray 43. After the toner image has been transferred from the photosensitive drum 26, its circumferential surface is wiped clean by a blade 44.

A detection switch 45 is placed in the copying machine body 2 at an upper position therein for detecting reciprocating movement of the optical system 20. When the detection switch 45 detects one reciprocating movement of the optical system 20, a count signal indicative of completion of a single copying operation is given to the copy supervising unit 3. Detection switches 46, 47 are disposed respectively above the cassettes 9, 10 for detecting when all of the sheets are fed out of the cassettes 9, 10. Between the transport rollers 13, 14, there is a detection switch 48 for detecting the arrival of the leading edge of a sheet at the transport rollers 13, 14. A detection switch 49 is located alongside of the feed belt 38 adjacent to the roller 36 for detecting a paper jam on the feed belt 38. A detection switch 50 is positioned between the thermal fixation unit 39 and the tray 43 for detecting when a sheet of copying paper is discharged into the tray 43. A photoelectric switch 51 is located adjacent to the photosensitive drum 26 for detecting when a sheet of copying paper is wound around the photosensitive drum 26.

Figure 3:
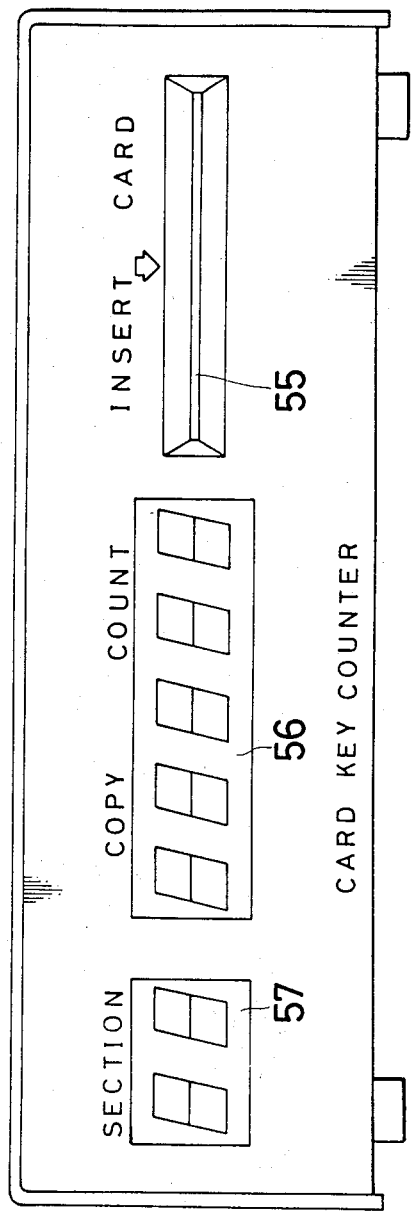
FIG. 3 is a front view of a copy supervising unit.
Figure 4:
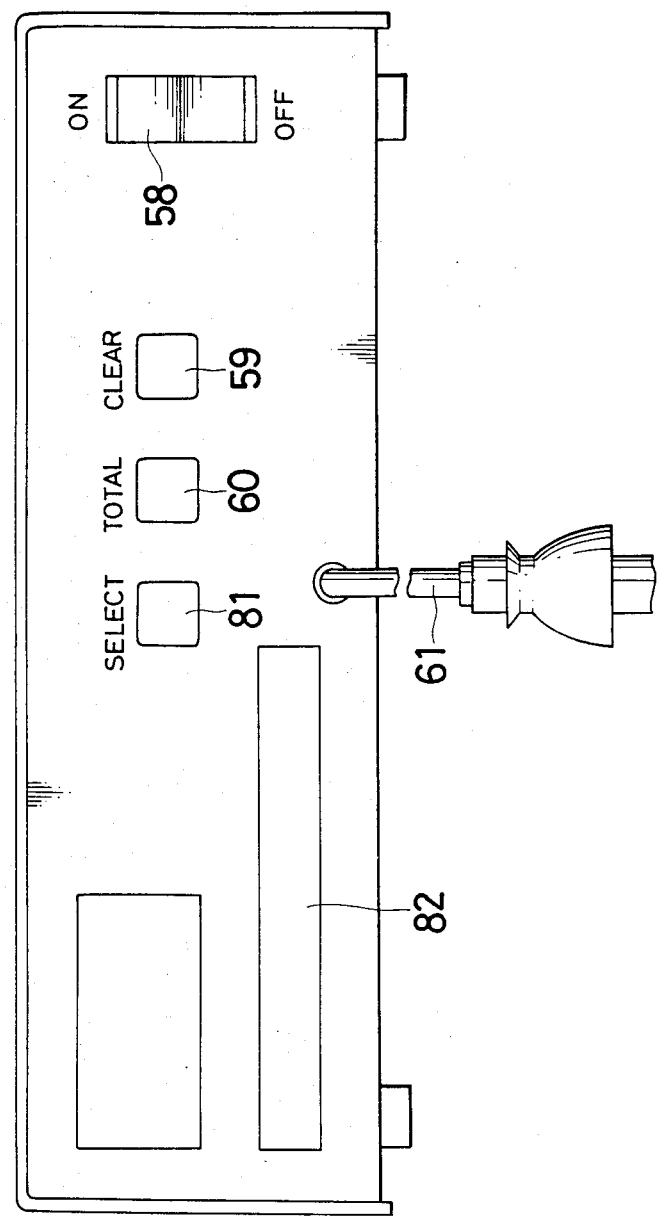
FIG. 4 is a rear view of the copy supervising unit of FIG. 3.

As shown in FIGS. 3 and 4, the copy supervising unit 3 has on its face a magnetic-card insertion slot 55, a copy count display 56, a section display 57. The section display 57 is capable of displaying two-figure section codes ranging from "00" to "99". The copy count display 56 can display five-figure copy counts ranging from "00000" to "99999". The copy supervising unit 3 has on its back a power supply button 58, a clear key 59, a total display instruction key 60, a select key 81, and a connector 82. A power supply cord or cable 61 extends through the back into the copy supervising unit 3.

Figure 5:
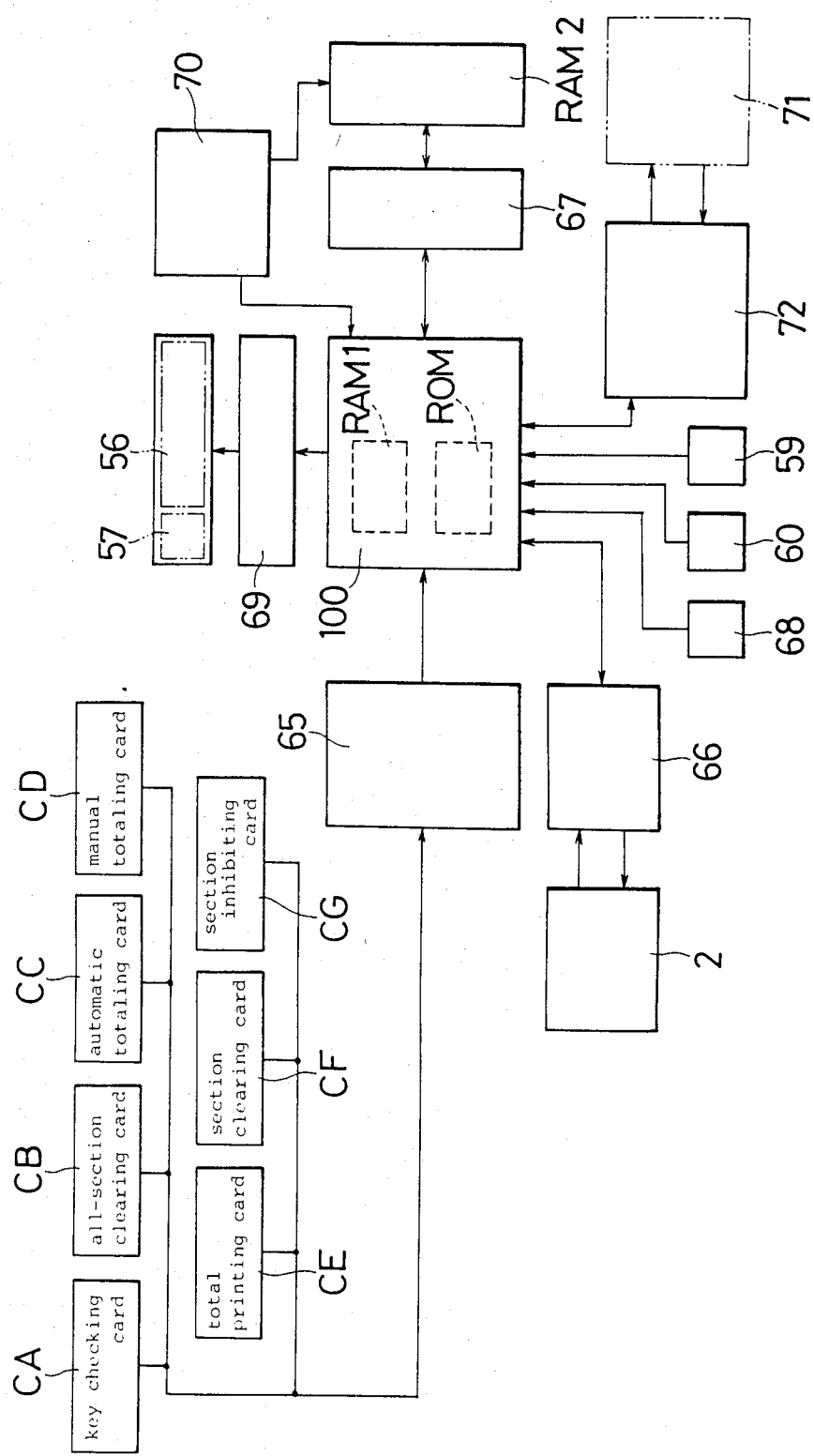
FIG. 5 is a block diagram of the copy supervising unit.

FIG. 5 shows in block form the arrangement of the copy supervising unit 3. The copy supervising unit 3 includes a processor 100 such as a microcomputer having a memory RAM1 for storing data to be displayed. The processor 100 is supplied with a signal from a magnetic card reader 65, the signal being indicative of data read out of a magnetic card inserted in the insertion slot 55. The copying machine body 2 applies a count signal through an interface circuit 66 to the processor 100 each time a single copying operation is completed. The processor 100 supplies the copying machine body 2 through the interface circuit 66 with a signal indicative of whether a copying operation is permitted. More specifically, a copying operation is permitted when a signal of high level is given to the copying machine body 2 from processor 100, and inhibited when a signal of low level is given to the copying machine body 2. The processor 100 is connected through an interface circuit 67 to a random-access memory RAM2 serving as an external storage. The random-access memory RAM2 is a nonvolatile memory for storing a total copy count for each section code with a flag attached thereto which indicates whether copying operation is permitted or not. The processor 100 is also supplied with signals from the clear key 59, the total display instruction key 60, and a card detection switch 68. The card detection switch 68 serves to detect whether a magnetic card is inserted in the insertion slot 55 or not. The card detection switch 68 may be in the form of a photoelectric switch for detecting the leading edge of a magnetic card inserted. The processor 100 applies display signals to the section display 57 and the copy count display 56 through a driver circuit 69. A power supply circuit 70 is connected to the processor 100 and the random-access memory RAM2.

A printer 71 (shown by the imaginary line in FIGS. 1 and 2) may be mounted on the copy supervising unit 3 and connected via an interface circuit 72 to the processor 100.

A total of seven magnetic cards are used with the copy supervising unit 3. The magnetic cards include (1) a key checking magnetic card CA, (2) an all-section clearing magnetic card CB, (3) an automatic totaling magnetic card CC, (4) a manual totaling magnetic card CD, (5) a total printing magnetic card CE, (6) a section clearing magnetic card CF, and (7) a section inhibiting magnetic card CG. By inserting these cards in the insertion slot 55, the content of each magnetic card is read by the card reader 65. In response to the content thus read, the copy supervising unit 3 carries out various processes such for example as total copy count display, inhibition and initiation of a copying operation in the copying machine body 2, clearing of a total count under the control of a program stored in a read-only memory ROM in the processor 100.

A single key checking magnetic card CA or a plurality of such key checking magnetic cards CA are allotted to each section. When the key checking magnetic card CA is inserted in the insertion slot 55, a copying operation can be started unless it is inhibited in advance. At the same time, a total number of copies are counted and stored for the section code recorded on the key checking magnetic card CA inserted. The all-section clearing magnetic card CB serves to clear away the total copy counts for all sections. When the automatic totaling magnetic card CC is inserted in the insertion slot 55, the total copy counts for all sections are automatically totalized. The manual totaling magnetic card CD allows the total copy counts to be totalized for desired sections only. The total printing magnetic card CE is used only when the printer 71 is mounted on the copy supervising unit 3. Upon insertion of the total printing magnetic card CE in the insertion slot 55, a total copy count can be printed by the printer 71. The section inhibiting magnetic card CG is used to inhibit any copying operation in a particular section when the total copy count for that section is in excess of a given count or the key checking magnetic card for the section is lost. The section clearing magnetic card CF serves to clear the total copy count and the copying inhibition state for a desired section.

The all-section clearing magnetic card CB, the automatic totaling magnetic card CC, the manual totaling magnetic card CD, the total printing magnetic card CE, the section clearing magnetic card CF, and the section inhibiting magnetic card CG are required to be allotted, one for each card, only to a section supervising the electrostatic copying machine 1.

Figure 6A:
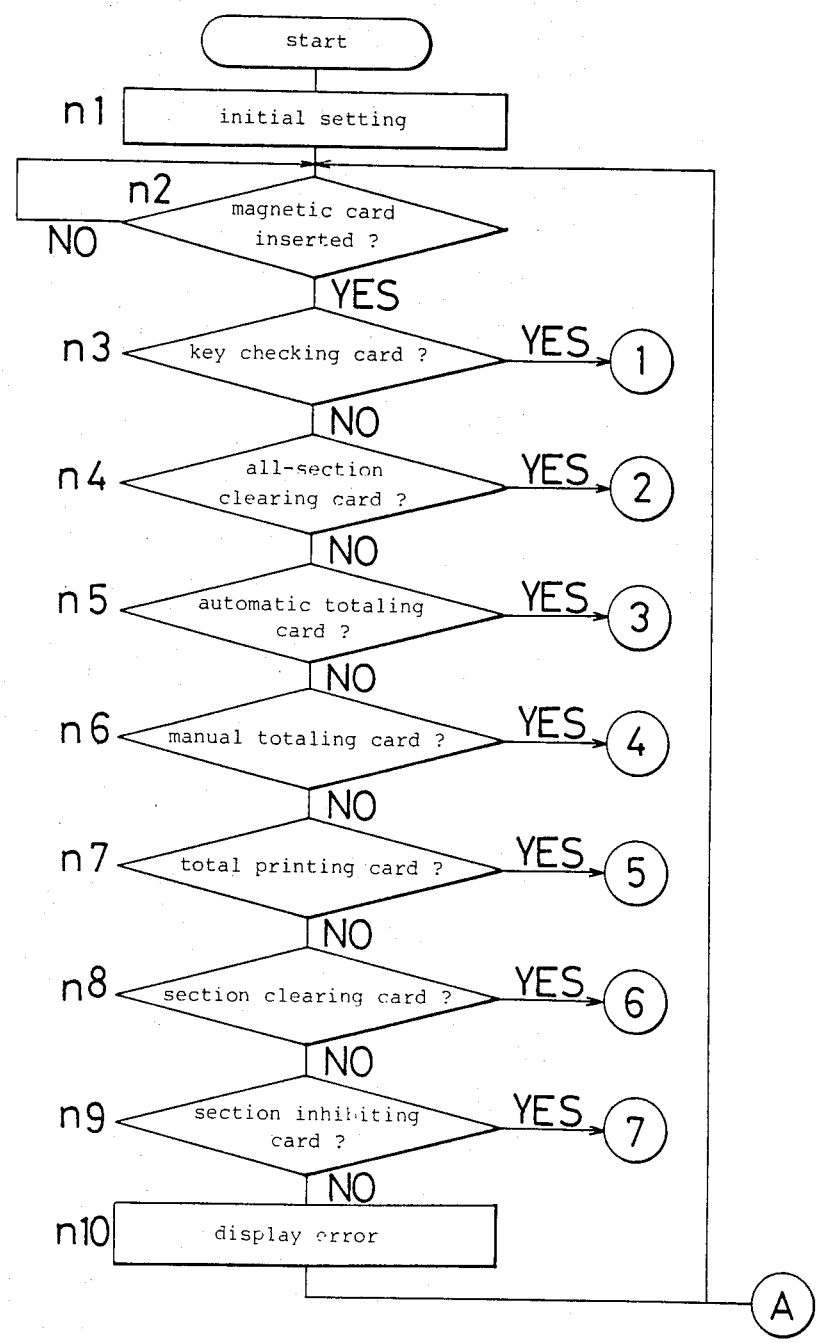
FIGS. 6(a), 6(b), 6(c), 6(d), 6(e), 6(f), 6(g), 6(h) are flow charts showing successive steps of operation of the copy supervising unit.

The processing procedures carried out for the respective magnetic cards inserted will be described with reference to FIGS. 6(a) through 6(h). In FIG. 6(a), for starting a copying operation, the power supply button 8 on the copying machine body 2 and the power supply button 58 on the copy supervising unit 3 are turned on for initial setting at a first step n1. A magnetic card is then inserted in the insertion slot 55. The card detection switch 68 (FIG. 5) detects in a second step n2 whether the magnetic card is inserted or not. Third through ninth steps n3–n9 determine which magnetic card is inserted in the insertion slot 55. When a card other than the magnetic cards CA through CG that supervises copy counts in the electrostatic copying machine 1 is inserted, an "ErrOr" is displayed on the copy count display 56 at a tenth step n10 as illustrated in FIG. 7 at (1). The error display is continued until the wrong card is pulled out of the insertion slot 55. When the wrong card is removed, the program goes back to the second step n2. Then, a proper magnetic card should be inserted in the insertion slot 55.

Figure 6B:
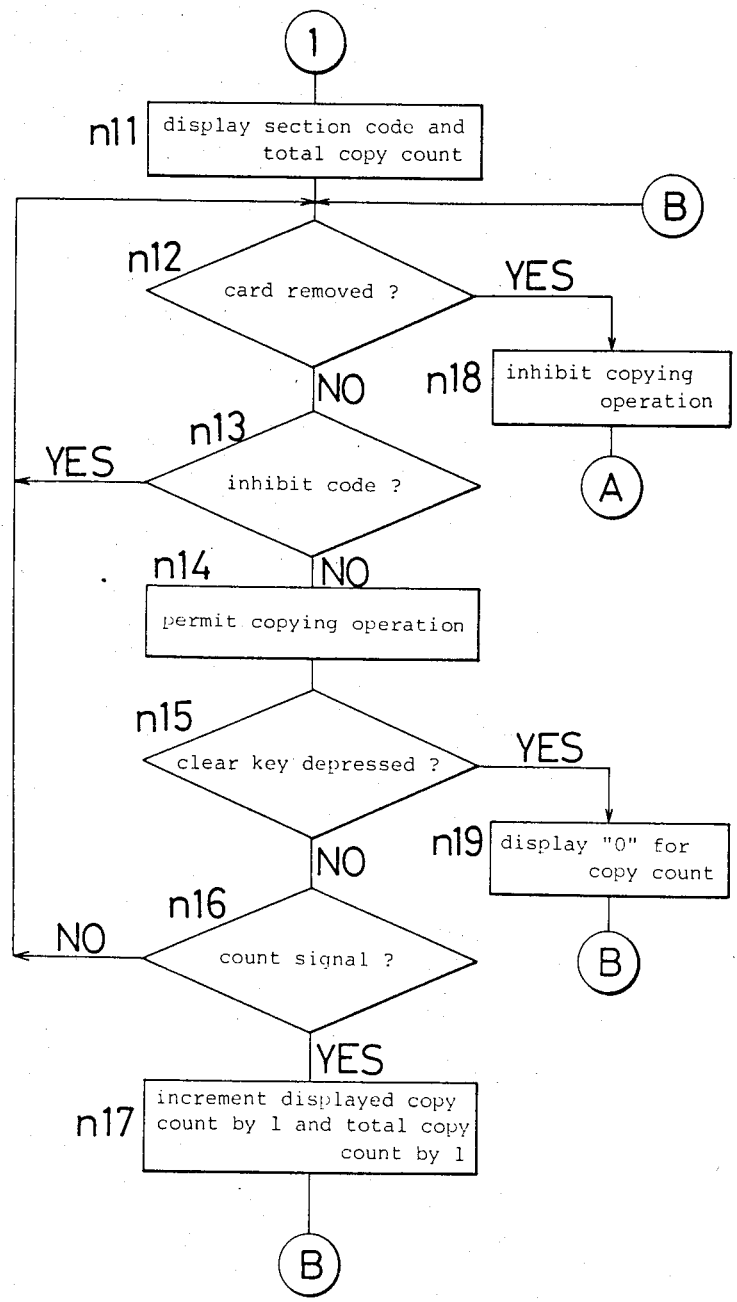

It is now assumed that the key checking magnetic card CA is inserted. The key checking magnetic card CA is verified by the third step n3, and the program then goes to an eleventh step n11 as shown in FIG. 6(b). The eleventh step n11 enables the section display 57 to display a section code recorded on the key checking magnetic card CA inserted. At the same time, the stored total copy count corresponding to the section code is read out of the random-access memory RAM2 into the display data memory RAM1 in the processor 100, and also displayed on the count display 56. Therefore, insertion of a key checking magnetic card CA results in a display of the total copy count for the section associated with the key checking magnetic card CA inserted.

A twelfth step n12 determines whether the key checking magnetic card CA is pulled out of the insertion slot 55. If the key checking magnetic card CA remains inserted, the program proceeds to a thirteenth step n13. The thirteenth step n13 determines whether the section associated with the inserted card CA is prohibited from copying operation or not. If not prohibited, the program goes on to a fourteenth step n14. A process for inhibiting copying operations will be described in detail in FIG. 6(h). In the fourteenth step n14, a signal of high level is delivered through the interface circuit 66 to the copying machine body 2 to permit the latter to effect a copying operation. Then, a fifteenth step n15 ascertains whether the clear key 59 is depressed or not. If not depressed, the program goes to a sixteenth step n16. After the fourteenth step n14, the print button 4 on the copying machine body 2 is touched to initiate the copying operation in the copying machine body 2. In response to the copying operation, a count signal is given from the copying machine body 2 to the processor 100 through the interface circuit 66. The sixteenth step n16 determines whether the count signal is entered or not. If the count signal is inputted, then the program proceeds to a seventeenth step n17. In the seventeenth step n17, the data stored in the display data memroy RAM1 in the processor 100 is incremented by "1", and the count sum is displayed on the copy count display 56. Simultaneously, the total copy count stored in the random-access memory RAM2 for the corresponding section is also incremented by "1". After the seventeenth step n17, the program returns back to the twelfth step n12.

When the key checking magnetic card CA is pulled out of the insertion slot 55 in the twelfth step n12, a signal of low level is given to the copying machine body 2 in an eighteenth step n18, making the copying machine body 2 incapable of effecting copying operations. The program goes from the eighteenth step n18 back to the second step n2 in FIG. 6(a). When there is an inhibition code set in the thirteenth step n13, and when there is no count signal in the sixteenth step n16, the program goes back to the twelfth step n12.

If the clear key 59 is depressed in the fifteenth step n15, then the display data memory RAM1 in the processor 100 is cleared in a ninteenth step n19. The copy count display 56 then displays "00000". With the copy count display 56 cleared to "00000", it can be used as a display for displaying the number of copies completed. More specifically, on the assumption that the copying machine body 2 is capable of automatically taking a two-figure number of copies, the ten keys 5 (FIG. 1) are used to set "99" for an automatic copying operation. When the copying operation is finished, the copy count display 56 displays "00099". The ten keys 5 are further depressed to set an additional "99" for an automatic copying operation. The copy count display 56 then displays "00198", with the result that a total of 198 copies are produced.

Figure 6D:
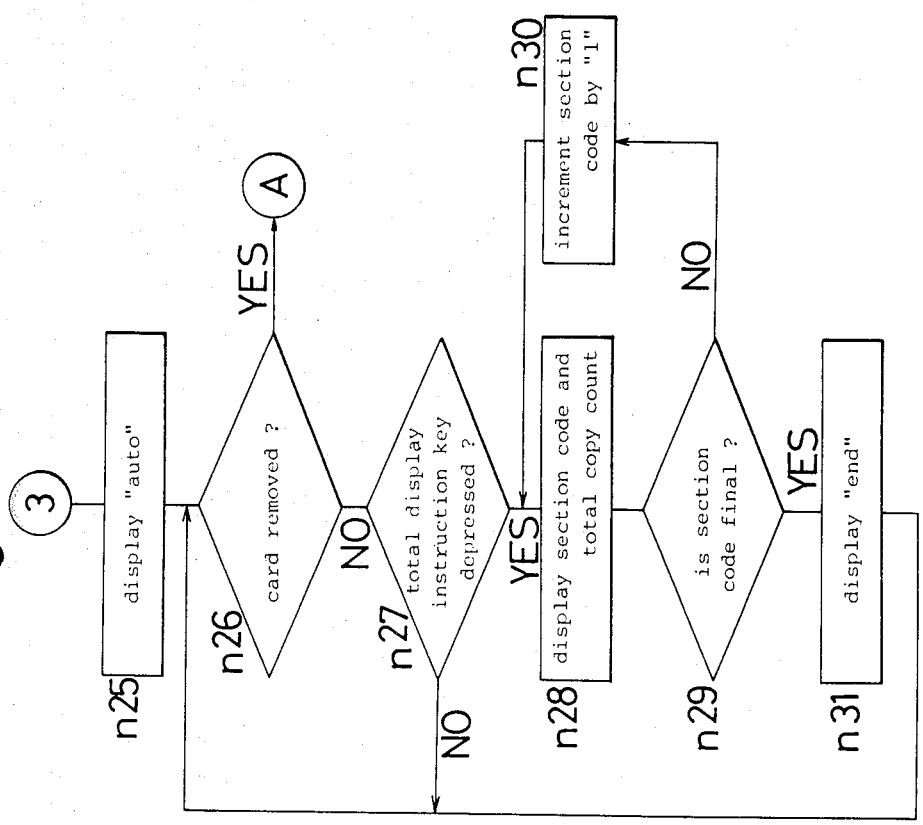
Figure 6C:
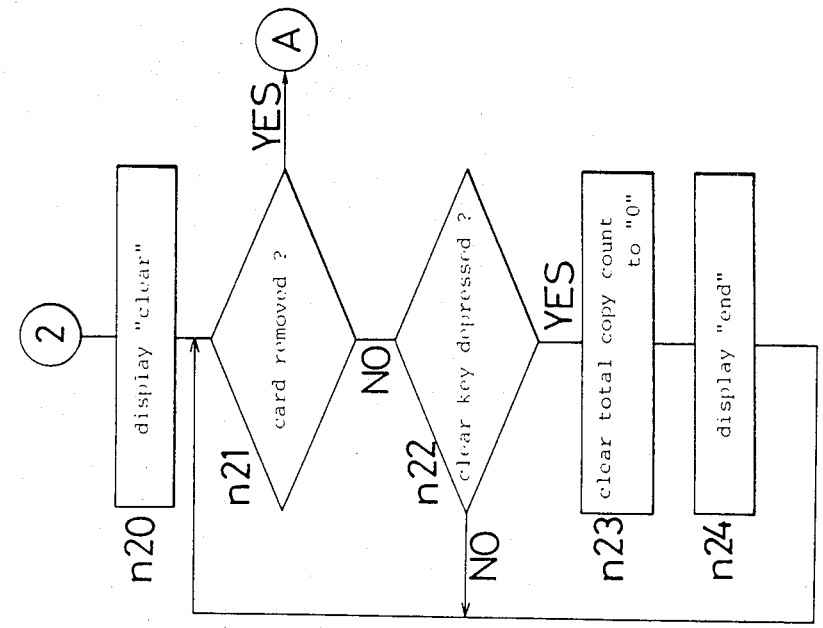

When the all-section clearing magnetic card CB is inserted, the program goes from the fourth step n4 in FIG. 6(a) to a twentieth step n20 in FIG. 6(c). In the twentieth step n20, an indication as illustrated in FIG. 7 at (2) is displayed. A following twenty-first step n21 determines whether the all-section clearing magnetic card CB is pulled out or not. If pulled out, then the program goes back to the second step n2. If not, a twenty-second step n22 ascertains whether or not the clear key 59 is depressed. If not, then the program returns to the step n21. If depressed, then the total copy counts for all sections stored in the random-access memory RAM2 are cleared to "0" in a twenty-third step n23. A twenty-fourth step n24 then displays "End" as shown in FIG. 7 at (3), and the program goes back to the step n21.

When the inserted magnetic card is judged as an automatic totaling magnetic card CC in the fifth step n5 in FIG. 6(a), the program goes to a twenty-fifth step n25 in FIG. 6(d). In the step n25, the copy count display 56 displays "Auto" shown in FIG. 7 at (4). Then, a twenty-sixth step n26 determines whether the automatic totaling magnetic card CC is pulled out of the insertion slot 55. If pulled out, the program goes back to the second step n2, and if not, the program proceeds to a twenty-seventh step n27. The step n27 ascertains whether the total display instruction key 60 is depressed or not. If not depressed, the program returns to the step n26, and if depressed, the program goes on to a twenty-eighth step n28. In the step n28, the total copy count for the first section code, say "01", is read out of the random-access memory RAM2. At the same time, the section code "01" and the total copy count are displayed on the section display 57 and the copy count display 56, respectively, for a fixed interval of time, say 3 seconds. Then, a twenty-ninth step n29 ascertains whether the section code is a final code or not. If not, the section code is incremented by "1" in a thirtieth step n30, and the program then goes back to the step n28. Thus, the total copy counts for the respective section codes are successively displayed. When the final section code is reached, the program goes from the step n29 to a thirty-first step n31 in which an end indication is displayed. The program then goes back to the step n26.

Figure 6F:
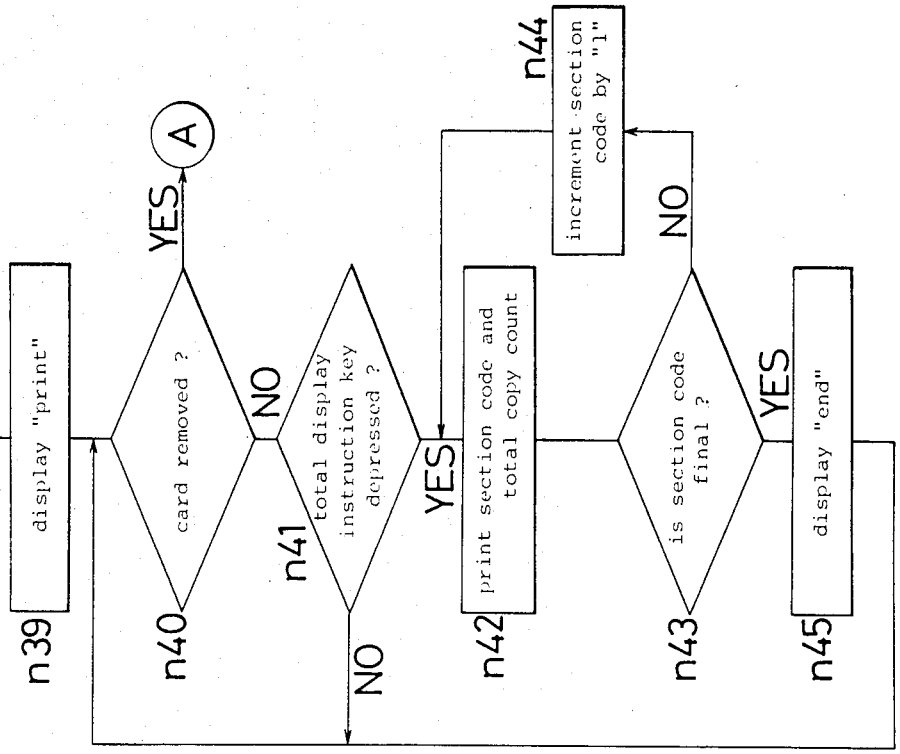
Figure 6E:
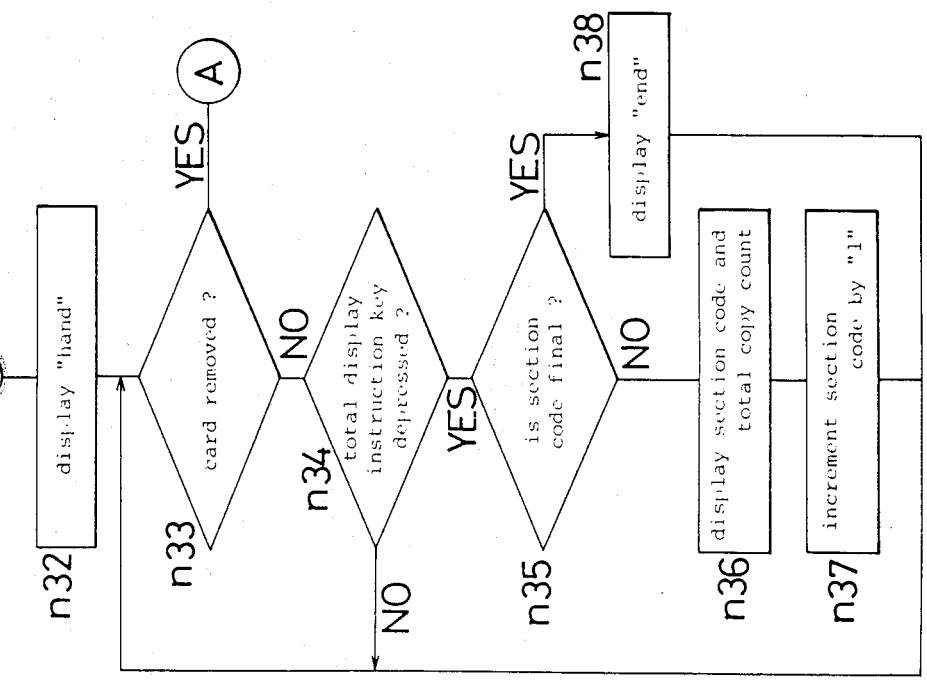

When the inserted card is determined in the sixth step n6 (FIG. 6(a)) as a manual totaling magnetic card CD, the program goes to a thirty-second step n32 in FIG. 6(e) in which "HAnd" as shown in FIG. 7 at (5) is displayed. A next thirty-third step n33 determines whether the manual totaling magnetic card CD is removed or not. If not, then a following thirty-fourth step n34 ascertains whether the total display instruction key 60 is depressed or not. If depressed, then a thirty-fifth step n35 determines whether the section code is a final one or not. If not a final section code, then the program goes on to a thirty-sixth step n36. In the step n36, the total copy count in the first section code, "01" for instance, is read out of the random-access memory RAM2. At the same time, the section code "01" and the total copy count are displayed respectively on the section display 57 and the copy count display 56. The section code is then incremented by "1" in a thirty-seventh step n37, and the program then goes back to the step n33.

Therefore, by next depressing the total display instruction key 60, the total copy count for a next section code can be displayed. When the total displays instruction key 60 is depressed repeatedly at intervals, the total copy counts for the respective sections can be displayed in succession. When the display of the total copy count for the final section code is brought to an end, the program goes from the step n35 to a thirty-eighth step n38 in which an end indication is displayed on the copy count display 56.

When the inserted magnetic card is determined as a total printing magnetic card CE in the seventh step n7 in FIG. 6(a), the program goes from the seventh step n7 to a thirty-ninth step n39 in FIG. 6(f) in which the copy count display 56 displays "Print" as illustrated in FIG. 7 at (6). A fortieth step n40 determines whether the total printing magnetic card CE is removed from the insertion slot 55 or not. If not, the program goes to a following forty-first step n41 in which the total display instruction key 60 is depressed. In a forty-second step n42, the total copy count for the first section code "01" is read out of the random-access memory RAM2. At the same time, a print signal is delivered through the interface circuit 72 to the printer 71. The printer 71 is now enabled to print the section code "01" and the total copy count therefor. Thereafter, a forty-third step n43 ascertains whether the section code is a final one. If not a final section code, then the section code is incremented by "1" in a forty-fourth step n44. Then, the program goes back to the step n42, and the total copy count for a next section code is printed. The total copy counts for all of the sections are successively printed in this manner. After the total copy count for the final section code has been printed, the program proceeds from the step n43 to a forty-fifth step n45 in which an end indication is displayed on the copy count display 56.

Figure 6G:
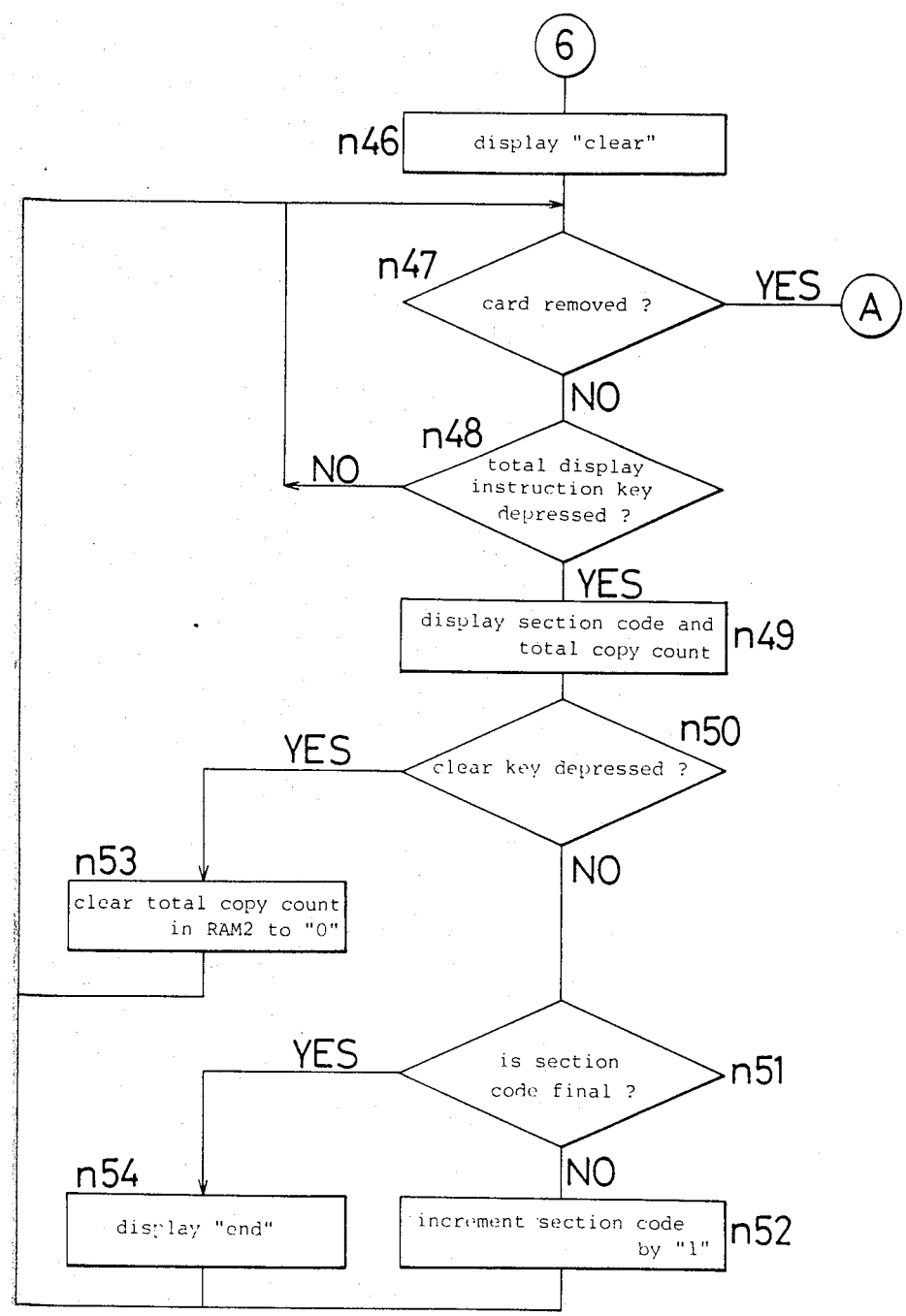

When the inserted magnetic card is a section clearing magnetic card CF, the program goes from the eighth step n8 in FIG. 6(a) to a forty-sixth step n46 in FIG. 6(g) in which "CLEAr" is displayed on the copy count display 56 as shown in FIG. 7 at (7). Then, a forty-seventh step n47 ascertains whether the section clearing magnetic card CF is removed from the insertion slot 55 or not. If not, then a forty-eighth step n48 determines whether the total display instruction key 60 is depressed or not. If depressed, then the program proceeds to a forty-ninth step n49 in which the first section code and the total copy count therefor are displayed. Subsequently, a fiftieth step n50 ascertains whether the clear key 59 is depressed in a fixed period of time, say about 2 seconds. If the clear key 59 is not depressed, a fifty-first step n51 ascertains whether the section code is final or not. If not, the section code is incremented by "1" in a fifty-second step n52, and then the program returns back to the step n47.

Thus, the section codes and the corresponding total copy counts are successively displayed. When the clear key 59 is depressed while a section code to be cleared is being displayed, the program proceeds from the step n50 to a fifty-third step n53. In the step n53, the total copy count stored in the random-access memory RAM2 for the desired section is cleared to "0". The program then goes back to the step n47. Accordingly, it is possible to clear the total copy count for any desired section to "0". When the section code reaches a final code, the program proceeds from the step n51 to a fifty-fourth step n54 in which an end indication is displayed.

Figure 6H:
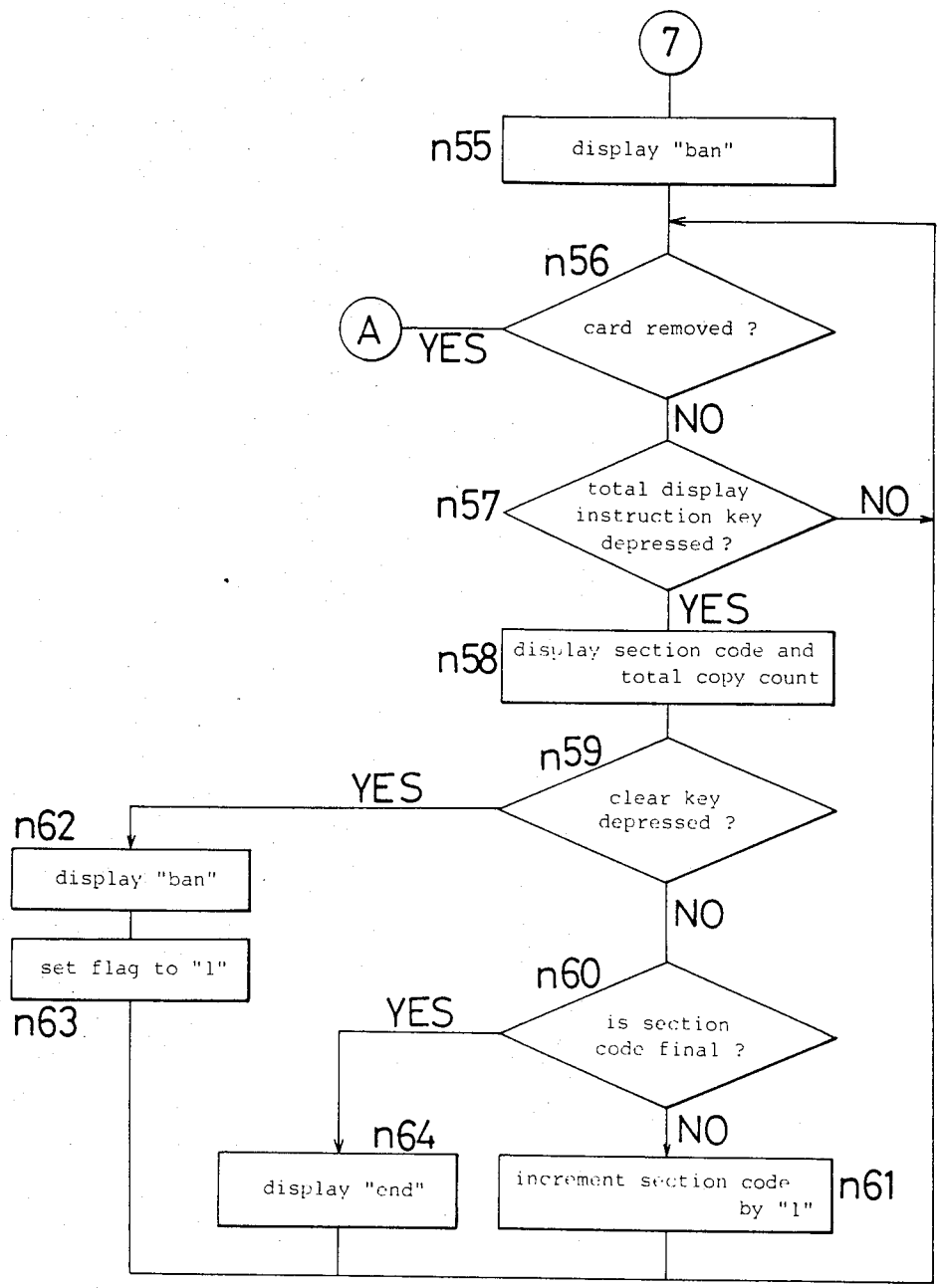

When the inserted magnetic card is judged as a section inhibiting magnetic card CG in the ninth step n9 in FIG. 6(a), the program goes to a fifty-fifth step n55 in FIG. 6(h) in which "bAn" is displayed on the copy count display 56 as illustrated in FIG. 7 at (8). A fifty-sixth step n56 determines whether or not the section inhibiting card CG is removed from the insertion slot 55. If not, then a fifty-seventh step n57 ascertains whether or not the total display instruction key 60 is depressed. If the total display instruction key 60 is depressed, then the first section code and the corresponding total copy count therefor are displayed in a fifty-eighth step n58. A fifty-ninth step n59 ascertains whether the clear key 59 is depressed in a certain period of time, say about 2 seconds. If the clear key 59 is not depressed, then the program goes to a sixtieth step n60 which determines whether the section code is a final code or not. If not a final code, the section code is incremented by "1" in a sixty-first step n61, and then the program goes back to a step n56. The section codes and the total copy counts therefor are thus sequentially displayed.

When a section code in which to inhibit copying operations is displayed while the section codes and the total copy counts are being successively displayed, the clear key 59 is depressed. Then, the program goes from the step n59 to a sixty-second step n62 in which "bAn" is also displayed on the copy count display 56. In a next sixty-third step n63, the flag for the corresponding section code in the random-access memory RAM2 is set to "1". With the flag set to "1", any subsequent copying operation for that section is inhibited. Stated otherwise, the step n13 in FIG. 6(b) determines that there is an inhibit code for the section under condideration, thereby prohibiting the section from taking copies on the copying mechine. After the step n63, the program returns to the step n56.

Accordingly, any copying operation in a desired section can be inhibited or banned as desired. When the section code is incremented up to a final code, the program proceeds from the step n60 to a sixty-forth step n64 in which an end indication is displayed.

In order to clear the copying inhibition state in each section, the all-section clearing magnetic card CB or the section clearing magnetic card CF is employed to reset the flag in the random-access memory RAM2 through the procedure described with reference to FIG. 6(c) or 6(g). This allows all or desired sections to be freed from the copying inhibition state.

As an alternative, a copying inhibition magnetic card with section codes for respective sections being recorded therein may be provided. Insertion of the copying inhibition magnetic card in the insertion slot 55 can set an inhibit flag in the random-access memory RAM 2 for a desired section.

Figure 8:
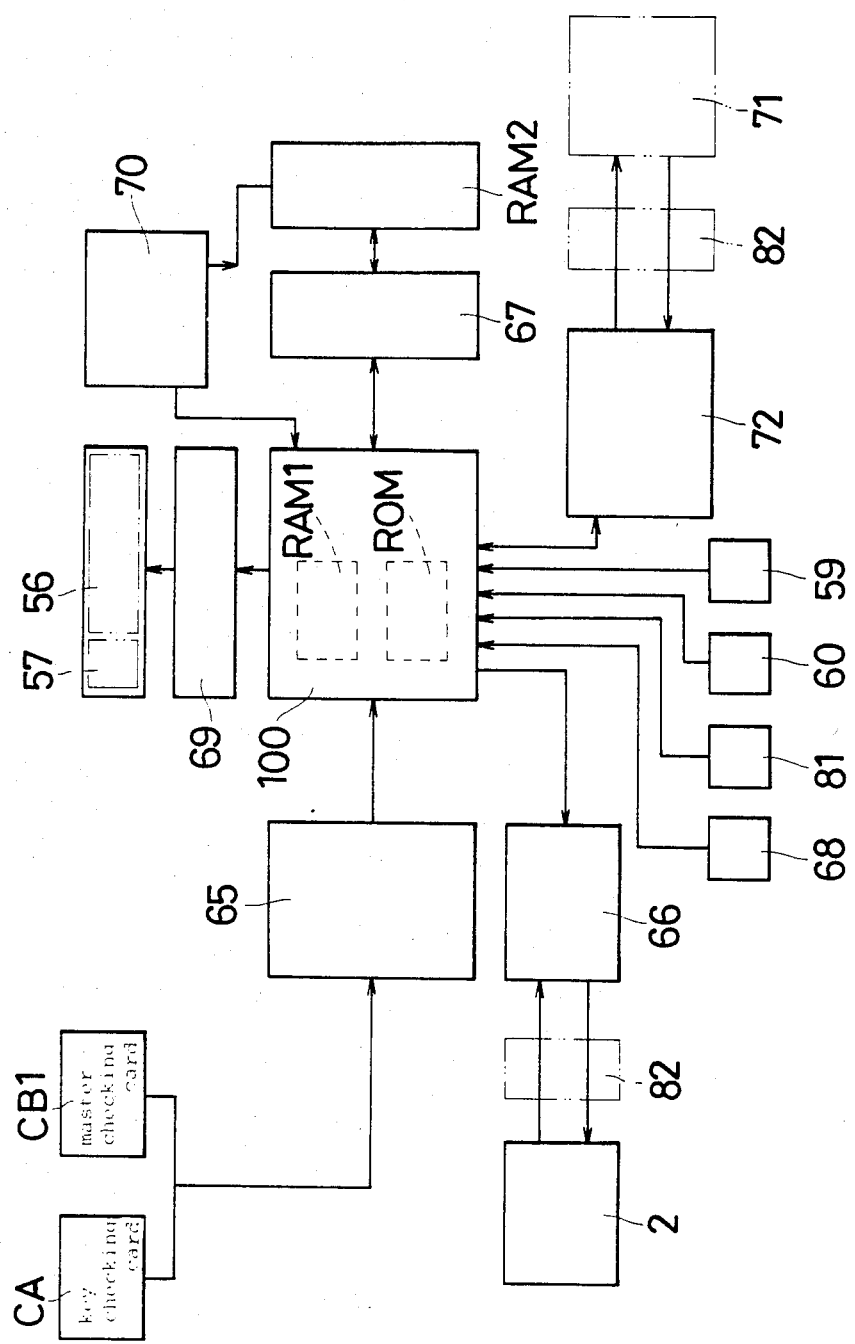
FIG. 8 is a block diagram of a copy supervising unit according to another embodiment of the present invention.

FIG. 8 is a block diagram of a copy supervising unit 3 according to another embodiment of the present invention. Like or corresponding parts in FIG. 8 are denoted by like or corresponding reference characters in FIG. 5. The copy supervising unit 3 includes a processor 100 having a memory RAM1 for storing data to be displayed. The processor 100 is supplied with a signal from a magnetic card reader 65, the signal being indicative of data read out of a magnetic card inserted in the insertion slot 55. The copying machine body 2 applies a count signal through connectors 82 (see also FIG. 4) and an interface circuit 66 to the processor 100 each time a single copying operation is completed. The processor 100 supplies the copying machine body 2 through the interface circuit 66 and the connectors 82 with a signal indicative of whether a copying operation is permitted. More specifically, a copying operation is permitted when a signal of high level is given to the copying machine body 2 from processor 100, and inhibited when a signal of low level is given to the copying machine body 2. The processor 100 is connected through an interface circuit 67 to a random-access memory RAM2 serving as an external storage. The random-access memory RAM2 is a nonvolatile memory for storing a total copy count for each section code with a flag attached thereto which indicates whether copying operation is permitted or not. The processor 100 is also supplied with signals from a clear key 59, a total display instruction key 60, a select key 81 (see also FIG. 4), and a card detection switch 68. The card detection switch 68 serves to detect whether a magnetic card is inserted in the insertion slot 55 or not. The card detection switch 68 may be in the form of a photoelectric switch for detecting the leading edge of a magnetic card inserted. The processor 100 applies display signals to the section display 57 and the copy count display 56 through a driver circuit 69. A power supply circuit 70 is connected to the processor 100 and the random-access memory RAM2.

A printer 71 (shown by the imaginary line in FIGS. 1 and 2) may be mounted on the copy supervising unit 3 and connected via the connectors 82 and an interface circuit 72 to the processor 100.

Two magnetic cards are employed by the copy supervising unit 3 shown in FIG. 8. They include a key checking magnetic card CA and a master checking magnetic card CB1. By inserting these cards in the insertion slot 55, the content of each magnetic card is read by the card reader 65. In response to the content thus read, the copy supervising unit 3 carries out various processes such for example as total copy count display, inhibition and initiation of a copying operation in the copying machine body 2, clearing of a total count under the control of a program stored in a read-only memory ROM in the processor 100.

A single key checking magnetic card CA or a plurality of such key checking magnetic cards CA are allotted to each section. When the key checking magnetic card CA is inserted in the insertion slot 55, a copying operation can be started unless it is inhibited in advance. At the same time, a total number of copies are counted and stored for the section code recorded on the key checking magnetic card CA inserted.

A single master checking magnetic card CB1 or a plurality of such master checking magnetic cards CB1 are allotted to a supervisory section for supervising or keeping records of the number of copies taken. A plurality of supervising items can be processed by inserting the single master checking magnetic card CB1 in the insertion slot 55 and depressing the select key 81. These supervising items include an all-section clearing process, an automatic totaling process, a manual totaling process, a total printing process, a section inhibiting process, and a section clearing process.

Figure 9A:
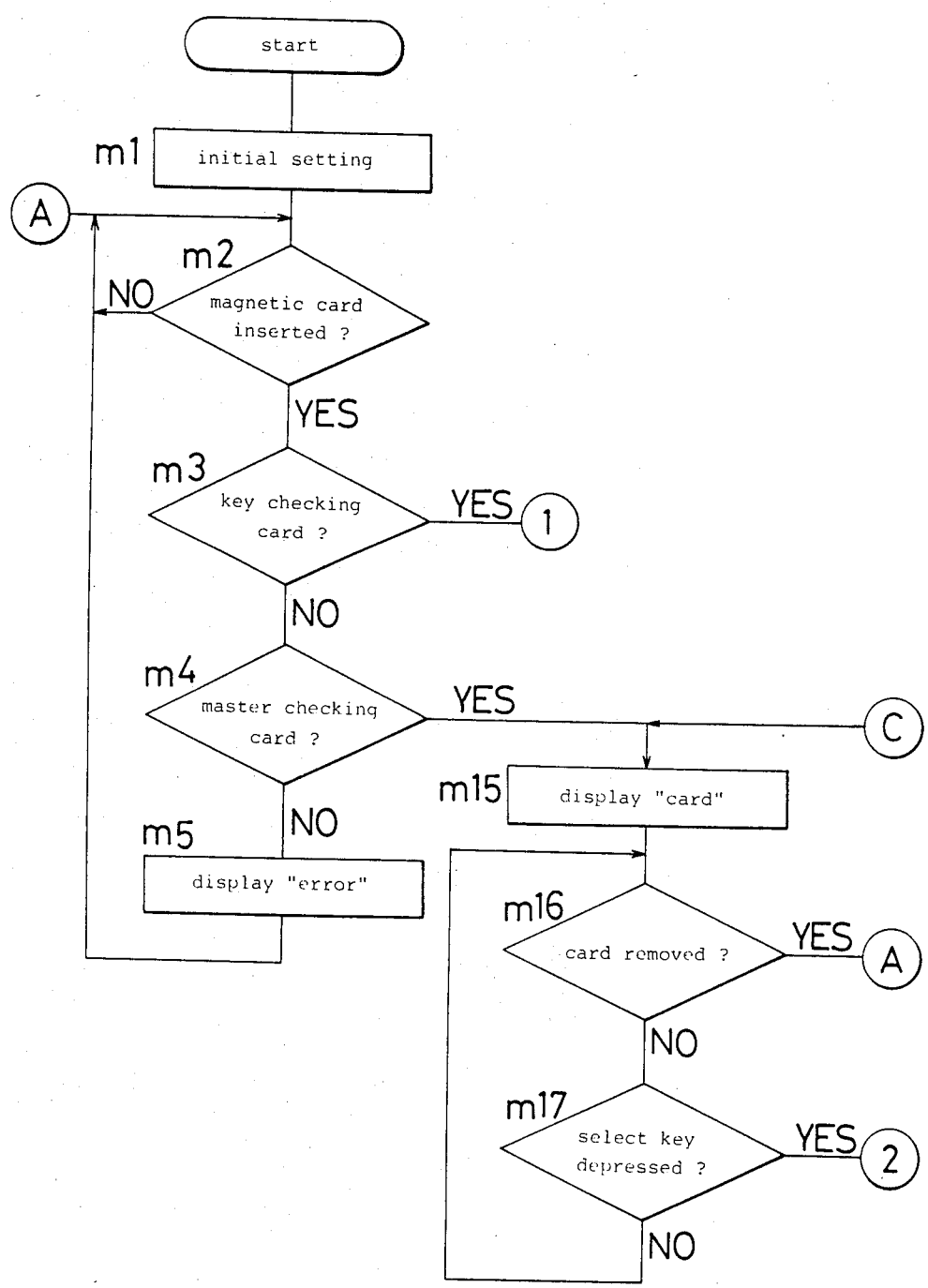
FIGS. 9(a), 9(b), 9(c), 9(d), 9(e), 9(f), 9(g), 9(h) are flow charts of progressive steps of operation of the copy supervising unit illustrated in FIG. 8.
Figure 9B:
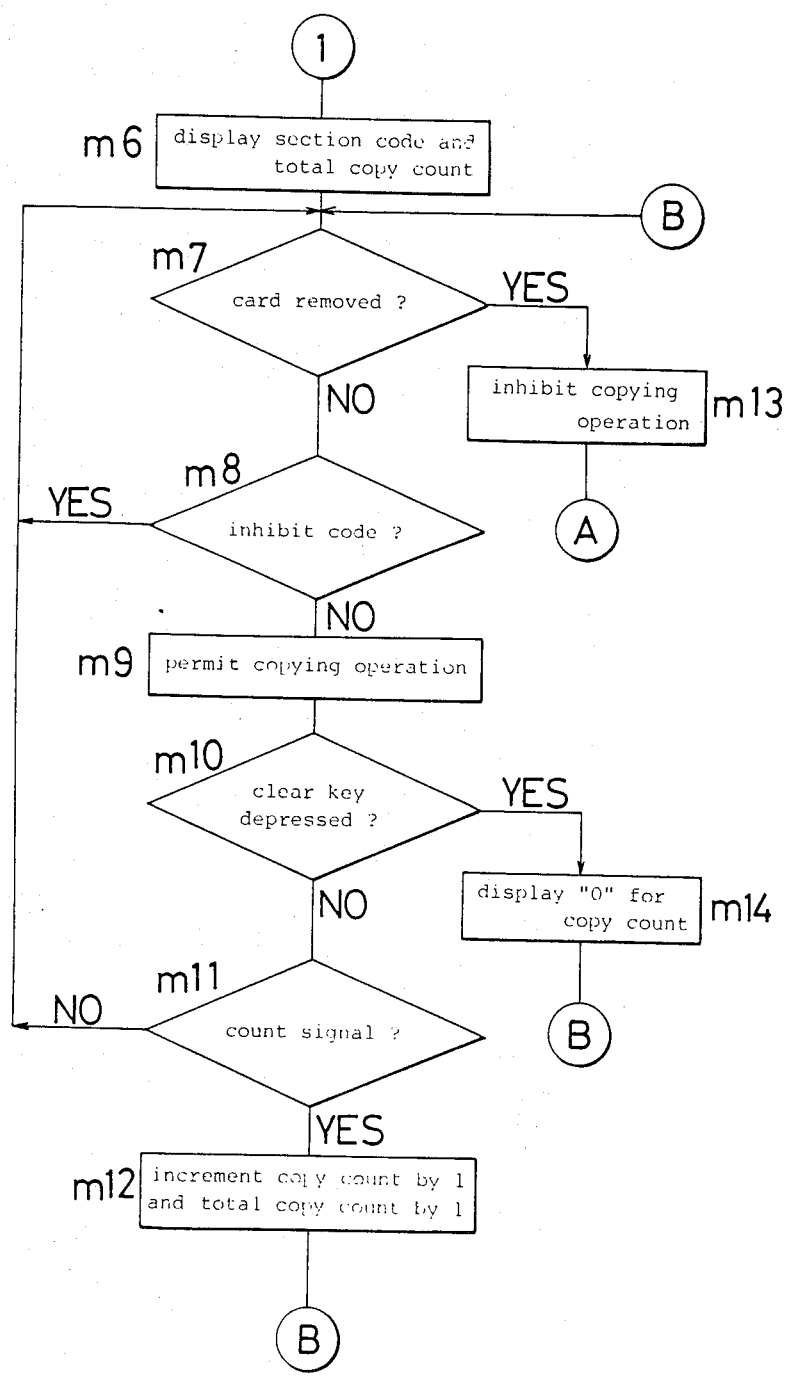

The processing procedures carried out for the respective magnetic cards inserted will be described with reference to FIGS. 9(a) through 9(h). In FIG. 9(a), for starting a copying operation, the power supply button 8 on the copying machine body 2 and the power supply button 58 on the copy supervising unit 3 are turned on for initial setting at a first step m1. A magnetic card is then inserted in the insertion slot 55. The card detection switch 68 (FIG. 8) detects in a second step m2 whether the magnetic card is inserted or not. Third and fourth steps m3, m4 determine which magnetic card is inserted in the insertion slot 55. When a card other than the magnetic cards CA and CB1 that supervises copy counts in the electrostatic copying machine 1 is inserted, an "ErrOr" is displayed on the copy count display 56 at a fifth step m5 as illustrated in FIG. 10 at (1). The error display is continued until the wrong card is pulled out of the insertion slot 55. When the wrong card is removed, the program goes back to the second step m2. Then, a proper magnetic card should be inserted in the insertion slot 55.

It is now assumed that the key checking magnetic card CA is inserted. The key checking magnetic card CA is verified by the third step m3, and the program then goes to a sixth step m6 as shown in FIG. 9(b). The sixth step m6 enables the section display 57 to display a section code recorded on the key checking magnetic card CA inserted. At the same time, the stored total copy count corresponding to the section code is read out of the random-access memory RAM2 into the display data memory RAM1 in the processor 100, and also displayed on the count display 56. Therefore, insertion of a key checking magnetic card CA displays the total copy count for the section associated with the key checking magnetic card CA inserted.

A seventh step m7 determines whether the key checking magnetic card CA is pulled out of the insertion slot 55. If the key checking magnetic card CA remains inserted, the program proceeds to an eighth step m8. The eighth step m8 determines whether the section associated with the inserted card CA is prohibited from copying operation or not. If not prohibited, the program goes on to a ninth step m9. A process for inhibiting copying operations will be described in detail in FIG. 9(h). In the ninth step m9, a signal of high level is delivered through the interface circuit 66 to the copying machine body 2 to permit the latter to effect a copying operation. Then, a tenth step m10 ascertains whether the clear key 59 is depressed or not. If not depressed, the program goes to an eleventh step m11. After the ninth step m9, the print button 4 on the copying machine body 2 is touched to initiate the copying operation in the copying machine body 2. In response to the copying operation, a count signal is given from the copying machine body 2 to the processor 100 through the interface circuit 66. The eleventh step m11 determines whether the count signal is entered or not. If the count signal is inputted, then the program proceeds to a twelfth step m12. In the twelfth step m12, the data stored in the display data memory RAM1 in the processor 100 is incremented by "1", and the count sum is displayed on the copy count display 56. Simultaneously, the total copy count stored in the random-access memory RAM2 for the corresponding section is also incremented by "1". After the twelfth step m12, the program returns back to the seventh step m7.

When the key checking magnetic card CA is pulled out of the insertion slot 55 in the seventh step m7, a signal of low level is given to the copying machine body 2 in a thirteenth step m13, making the copying machine body 2 incapable of effecting copying operations. The program goes from the thirteenth step m13 back to the second step m2 in FIG. 9(a). When there is an inhibition code set in the eighth step m8, and when there is no count signal in the eleventh step m11, the program goes back to the seventh step m7.

If the clear key 59 is depressed in the tenth step m10, then the display data memory RAM1 in the processor 100 is cleared in a fourteenth step m14. The copy count display 56 then displays "00000". With the copy count display 56 cleared to "00000", it can be used as a display for displaying the number of copies completed. More specifically, on the assumption that the copying machine body 2 is capable of automatically taking a two-figure number of copies, the ten keys 5 (FIG. 1) are used to set "99" for an automatic copying operation. When the copying operation is finished, the copy count display 56 displays "00099". The ten keys 5 are further depressed to set an additional "99" for an automatic copying operation. The copy count display 56 then displays "00198", with the result that a total of 198 copies are produced.

When the master checking card CB1 is inserted, the program goes from the fourth step m4 in FIG. 9(a) to a fifteenth step m15. In the fifteenth step m15, an indication as illustrated in FIG. 10 at (2) is displayed. A following sixteenth step m16 determines whether the master checking magnetic card CB1 is pulled out or not. If pulled out, then the program goes back to the second step m2. If not, a seventeenth step m17 ascertains whether or not the select key 81 is depressed. If not, then the program returns to the step m16. If depressed, then the program goes on to an eighteenth step m18 in FIG. 9(c).

In the eighteenth step m18, "CLEAr" is displayed on copy count display 56 as shown in FIG. 10 at (3). A following nineteenth step m19 determines whether the master checking magnetic card CB1 is pulled out of the insertion slot 55 or not. If pulled out, then the program goes back to the second step m2. If not, a twentieth step m20 ascertains whether the select key 81 is depressed or not. If the select key 81 is not depressed, the program goes on to a twenty-first step m21 which ascertains whether or not the clear key 59 is depressed. If not, then the program returns to the step m19. If depressed, then the total copy counts for all sections stored in the random-access memory RAM2 are cleared to "0" in a twenty-second step m22. A twenty-third step m23 then displays "End" as shown in FIG. 10 at (4), and the program goes back to the step m19.

Figure 9C:
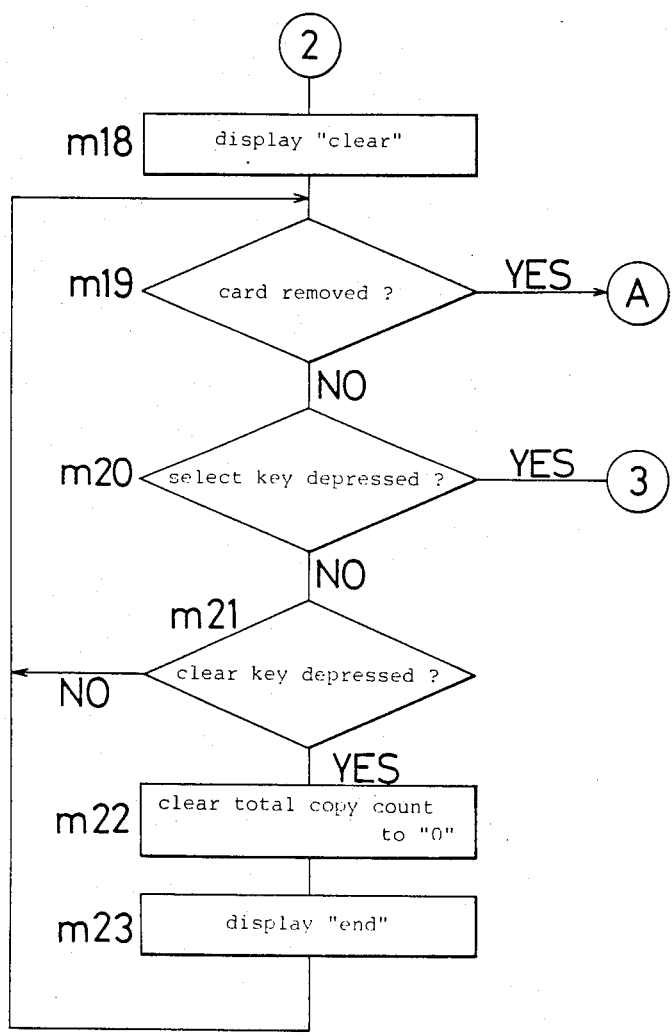
Figure 9D:
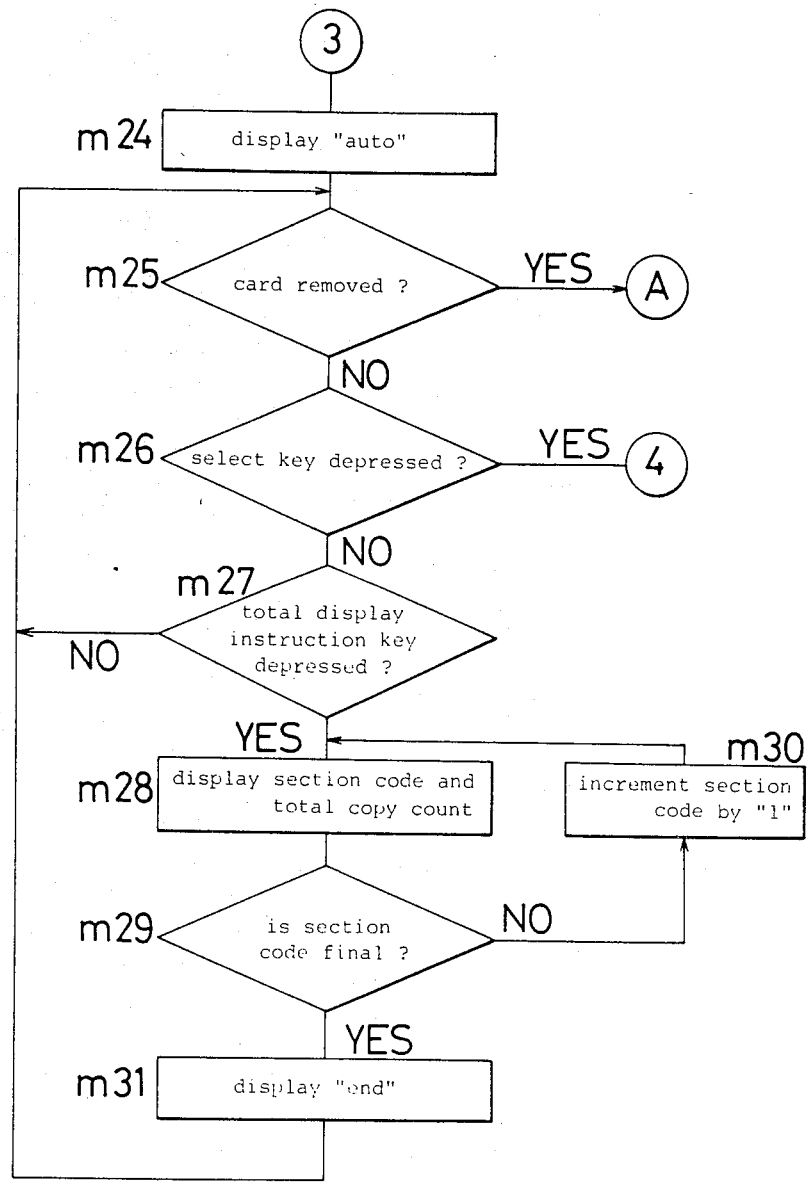
Figure 10:
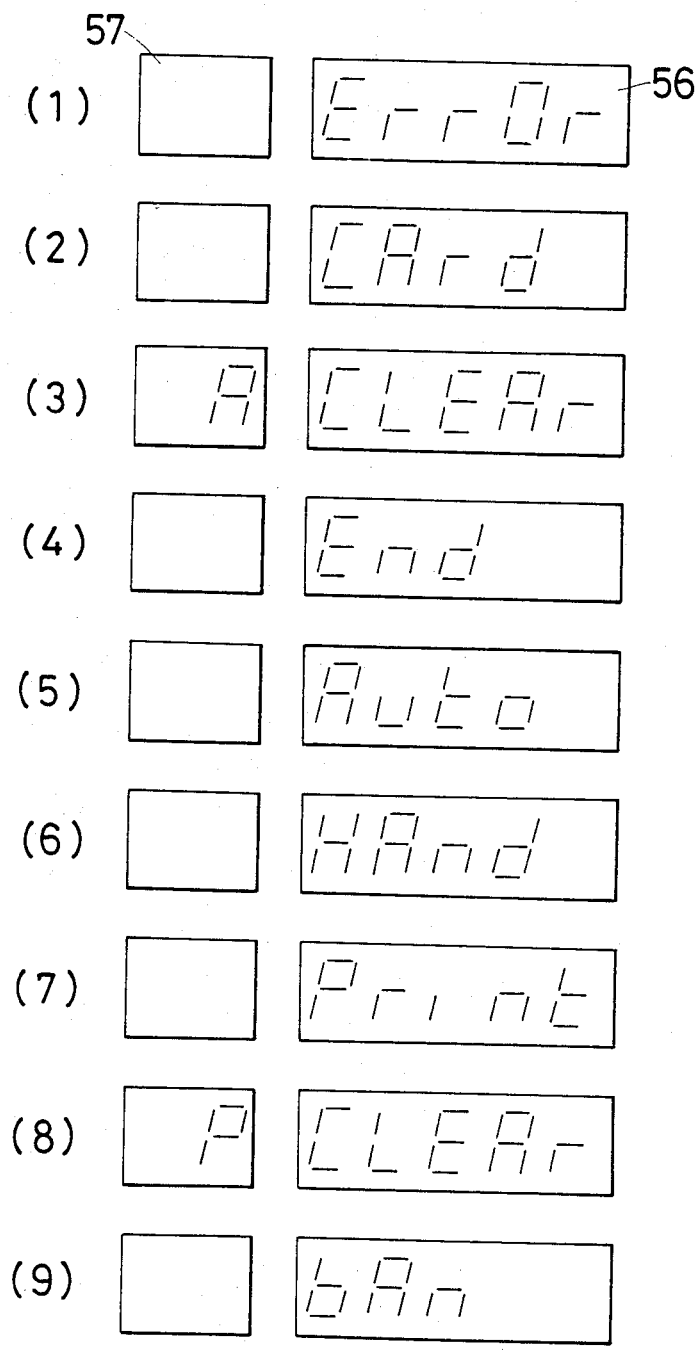
FIG. 10 shows a variety of indications displayed on the copy supervising unit.

When the select key 81 is found to be depressed in the step m20 in FIG. 9(c), the program goes to a twenty-fourth step m24 in FIG. 9(d). In the step m24, the copy count display 56 displays "Auto" shown in FIG. 10 at (5). Then, a twenty-fifth step m25 determines whether the master checking magnetic card CB1 is pulled out of the insertion slot 55. If pulled out, the program goes back to the second step m2, and if not, the program proceeds to a twenty-sixth step m26. The step m26 ascertains whether the select key 81 is depressed or not. If not depressed, the program goes on to a twenty-seventh step m27 which ascertains whether the total display instruction key 60 is depressed or not. If not depressed, the program returns to the step m25, and if depressed, the program goes on to a twenty-eighth step m28. In the step m28, the total copy count for the first section code, say "01", is read out of the random-access memory RAM2. At the same time, the section code "01" and the total copy count are displayed on the section display 57 and the copy count display 56, respectively, for a fixed interval of time, say 3 seconds. Then, a twenty-ninth step m29 ascertains whether the section code is a final code or not. If not, the section code is incremented by "1" in a thirtieth step m30, and the program then goes back to the step m28. Thus, the total copy counts for the respective section codes are successively displayed. When the final section code is reached, the program goes from the step m29 to a thirty-first step m31 in which an end indication is displayed. The program then goes back to the step m25.

Figure 9E:
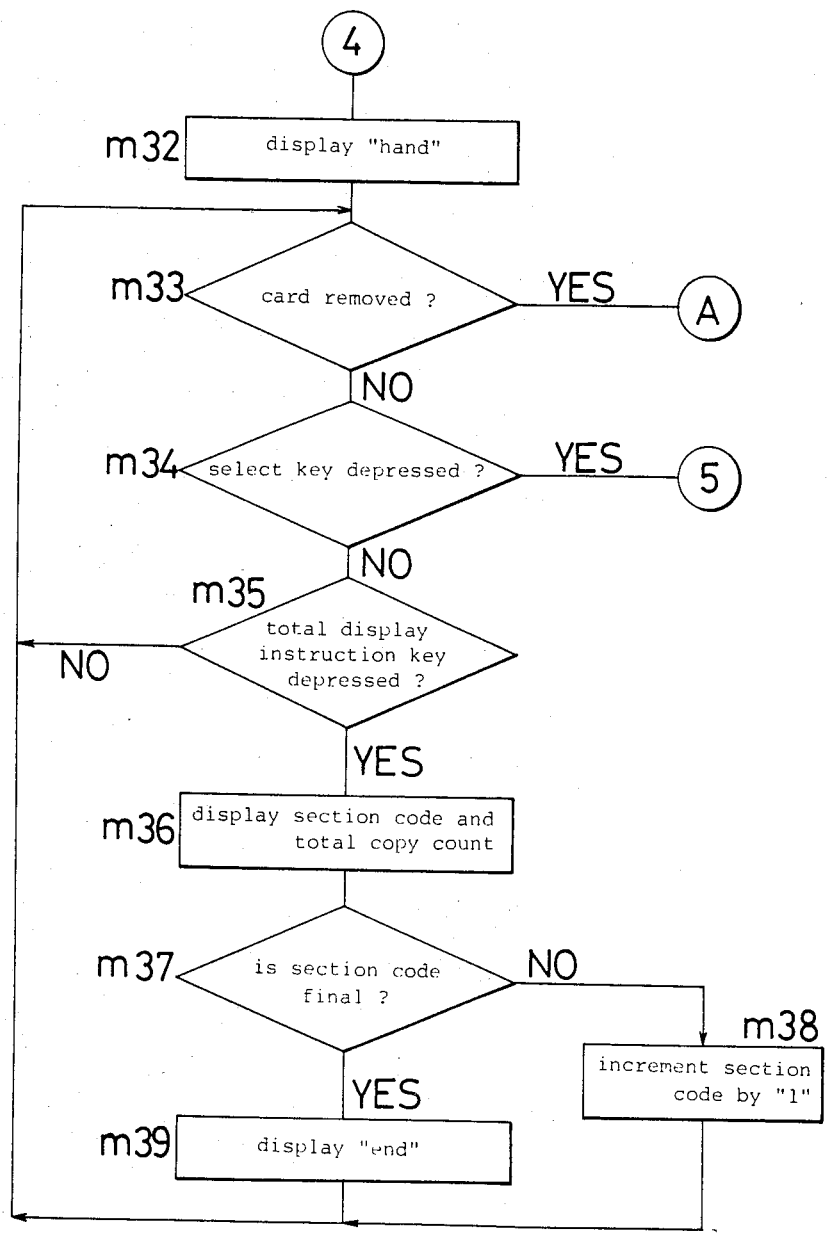

When the select key 81 is found to be depressed in the step m26 (FIG. 9(d)), the program goes to a thirty-second step m32 in FIG. 9(e) in which "HAnd" as shown in FIG. 10 at (6) is displayed. A next thirty-third step m33 determines whether the master checking card CB1 is removed or not. If removed, then the program goes back to the second step m2. If not removed, then a following thirty-fourth step m34 ascertains whether the select key 81 is depressed or not. If not depressed, the program proceeds to a thirty-fifth step m35, which determines whether the total display instruction key 60 is depressed or not. If not depressed, the program returns to the step m33. If depressed, the program goes on to a thirty-sixth step m36 in which the total copy count for the first section code, say "01", is read out of the random-access memory RAM2. At the same time, the section code "01" and the total copy count are displayed respectively on the section display 57 and the copy count display 56. The program then proceeds to a thirty-seventh step m37 which determines whether the section code is a final one or not. If not a final section code, then the program goes on to a thirty-eighth step m38 in which the section code is incremented by "1", and the program then goes back to the step m33.

Therefore, by next depressing the total display instruction key 60, the total copy count for a next section code can be displayed. When the total display instruction key 60 is depressed repeatedly at intervals, the total copy counts for the respective sections can be displayed in succession. When the display of the total copy count for the final section code is brought to an end, the program goes from the step m37 to a thirty-ninth step m39 in which an end indication is displayed on the copy count display 56. After the end indication has been made, the program returns to the step m33.

Figure 9F:
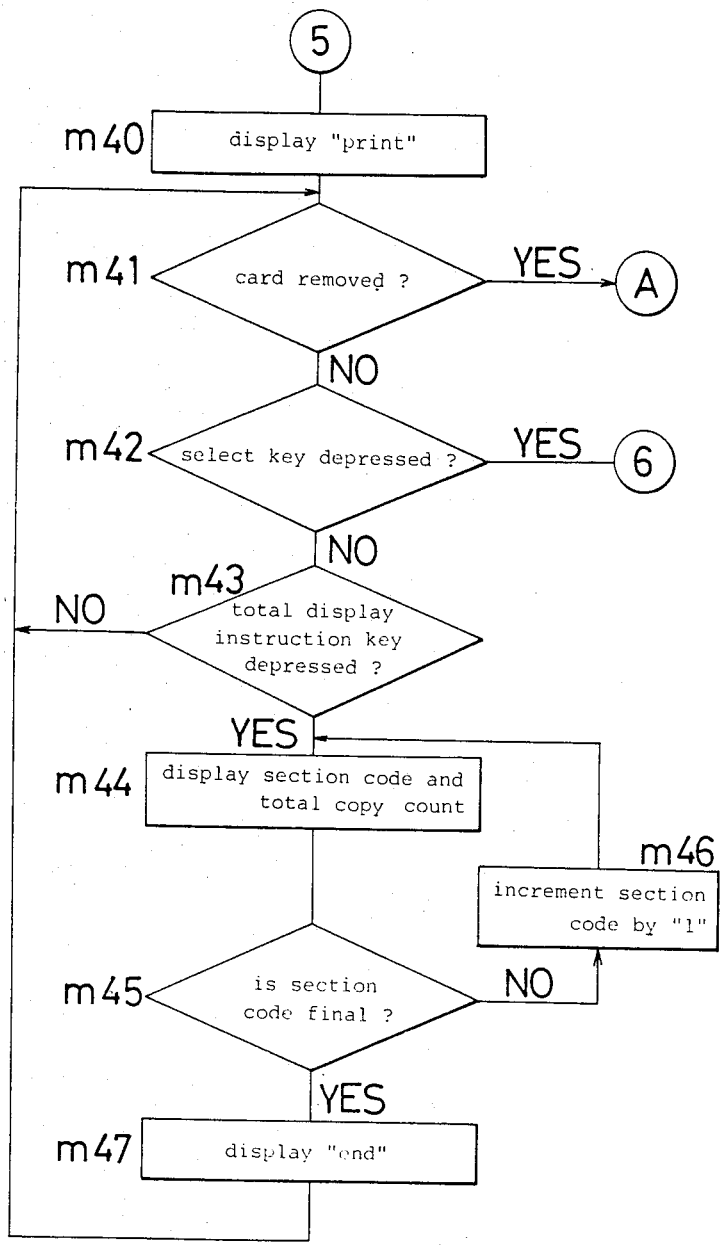

When the select key 81 is found to be depressed in the step m34 in FIG. 9(e), the program goes from the step m34 to a fortieth step m40 in FIG. 9(f) in which the copy count display 56 displays "Print" as illustrated in FIG. 10 at (7). A next forty-first step m41 determines whether the master checking magnetic card CB1 is removed from the insertion slot 55 or not. If the master checking magnetic card CB1 is removed, then the program goes back to the step m2. If not, then the program goes to a following forty-second step m42 which determines whether the select key 81 is depressed or not. If not depressed, then the program proceeds to a forty-third step m43 which determines whether the total display instruction key 60 is depressed or not. If not depressed, then the program goes back to the step m41. If depressed, then in a forty-fourth step m44, the total copy count for the first section code "01" is read out of the random-access memory RAM2. At the same time, a print signal is delivered through the interface circuit 72 to the printer 71. The printer 71 is now enabled to print the section code "01" and the total copy count therefor. Thereafter, a forty-fifth step m45 ascertains whether the section code is a final one. If not a final section code, then the section code is incremented by "1" in a forty-sixth step m46. Then, the program goes back to the step m44, and the total copy count for a next section code is printed. The total copy counts for all of the sections are successively printed in this manner. After the total copy count for the final section code has been printed, the program proceeds from the step m45 to a forty-seventh step m47 in which an end indication is displayed on the copy count display 56, and then the program returns back to the step m41.

Figure 9G:
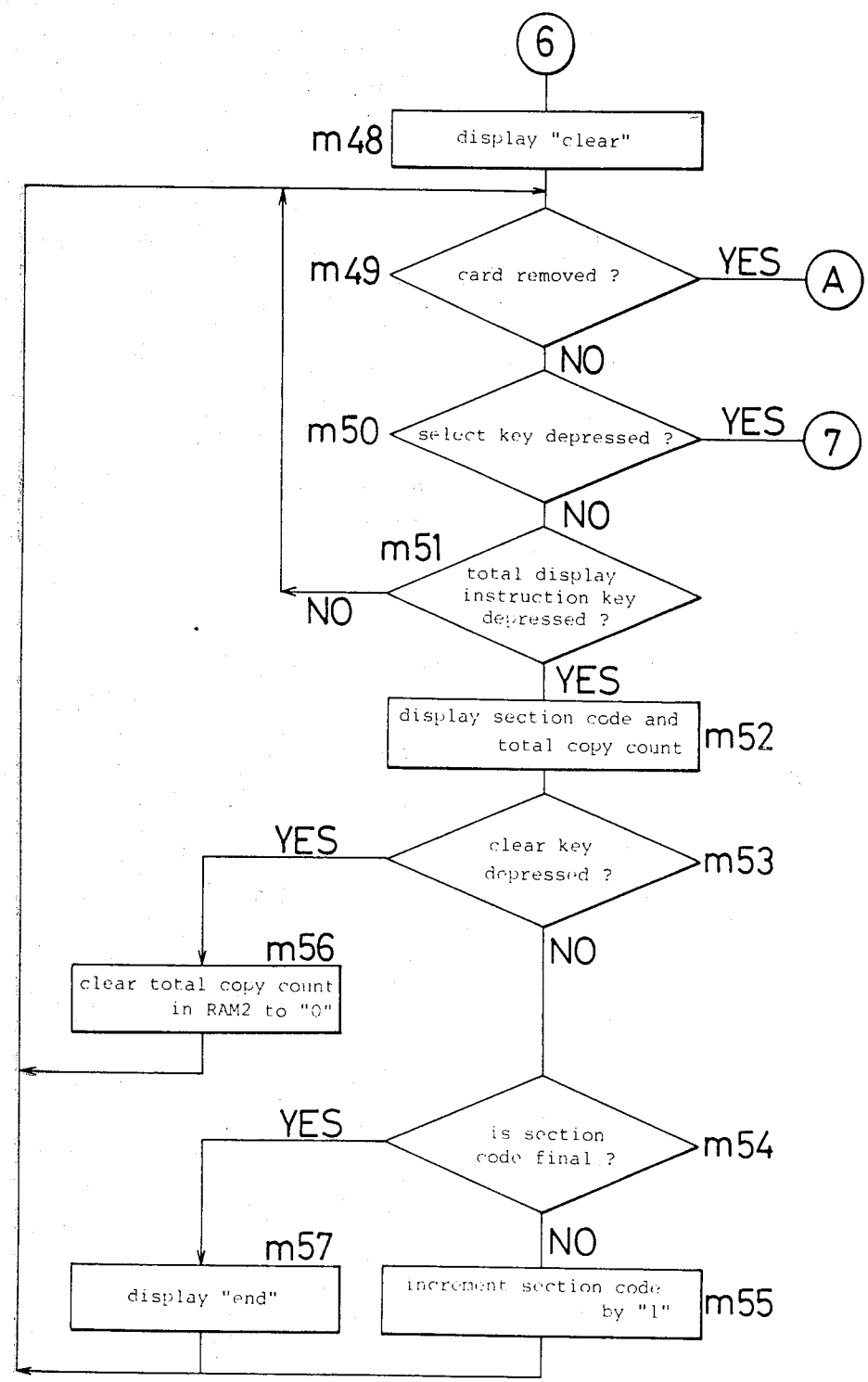

When the select key 81 is depressed in the step m42 in FIG. 9(f), the program goes to a forty-eighth step m48 in FIG. 9(g) in which "CLEAr" is displayed on the copy count display 56 as shown in FIG. 10 at (8). Then, a forty-ninth step m49 ascertains whether the master checking magnetic card CB1 is removed from the insertion slot 55 or not. If removed, then the program returns to the second step m2. If not, then a fiftieth step m50 determines whether the select key 81 is depressed or not. If it is not depressed, then a fifty-first step m51 ascertains whether the total display instruction key 60 is depressed or not. If the key 60 is not depressed, then the program goes back to the step m49. If the key 60 is depressed, then the program proceeds to a fifty-second step m52 in which the first section code and the total copy count therefor are displayed. Subsequently, a fifty-third step m53 ascertains whether the clear key 59 is depressed in a fixed period of time, say about 2 seconds. If the clear key 59 is not depressed, a fifty-fourth step m54 ascertains whether the section code is final or not. If not, the section code is incremented by "1" in a fifty-fifth step m55, and then the program returns back to the step m49.

Thus, the section codes and the corresponding total copy counts are successively displayed. When the clear key 59 is depressed while a section code to be cleared is being displayed, the program proceeds from the step m53 to a fifty-sixth step m56. In the step m56, the total copy count stored in the random-access memory RAM2 for the desired section is cleared to "0". The program then goes back to the step m49. Accordingly, it is possible to clear the total copy count for any desired section to "0". When the section code reaches a final code, the program proceeds from the step m54 to a fifty-seventh step m57 in which an end indication is displayed, and then the program returns back to the step m49.

Figure 9H:
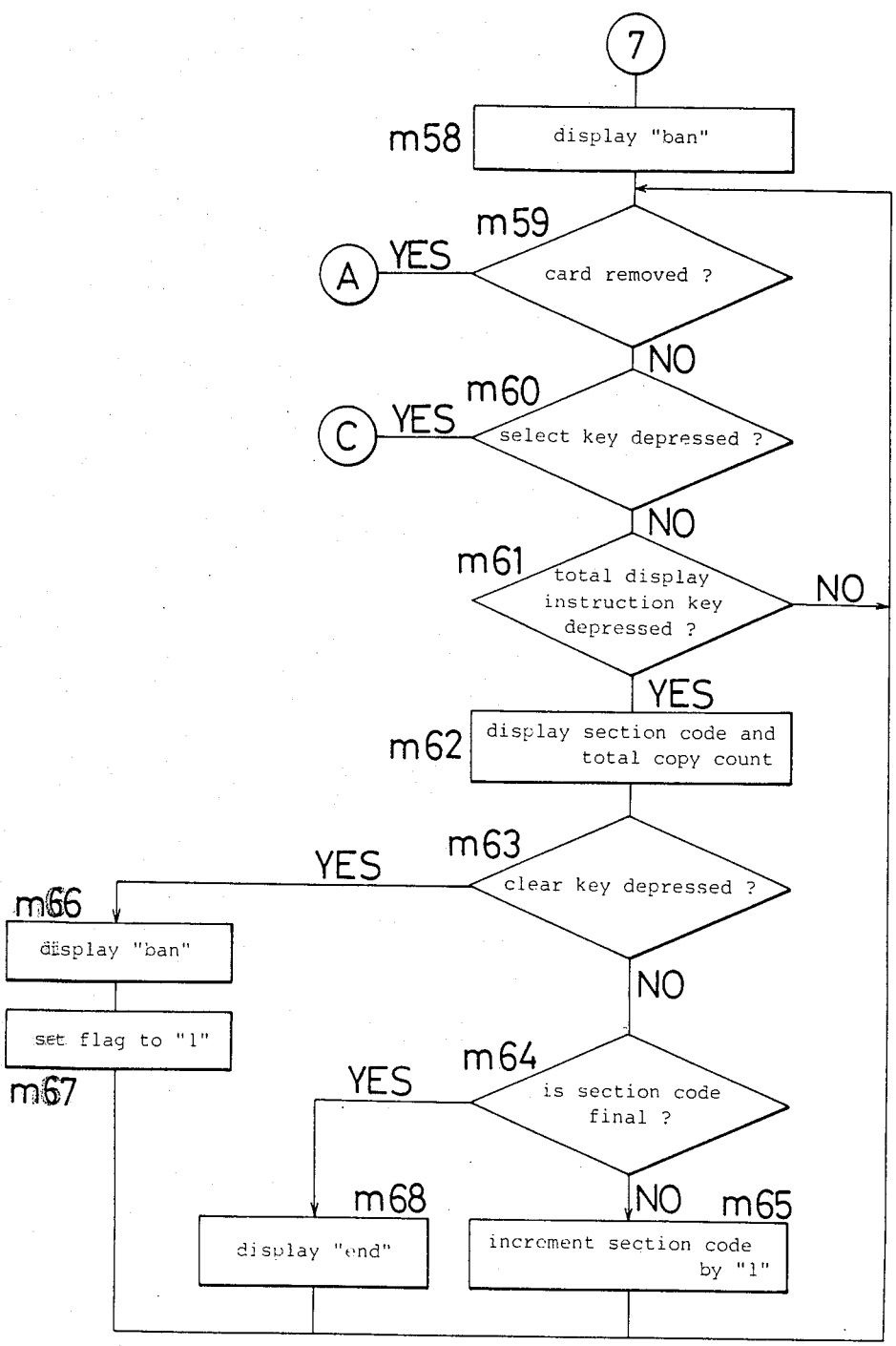

When the select key 81 is depressed in the step m50 in FIG. 9(g), the program goes to a fifty-eighth step m58 in FIG. 9(h) in which "bAn" is displayed on the copy count display 56 as shown in FIG.10 at (9). A fifty-ninth step m59 determines whether or not the master checking magnetic card CB1 is removed from the insertion slot 55. If removed, then the program returns to the second step m2. If not, then a sixtieth step m60 ascertains whether the select key 81 is depressed or not. If the select key 81 is not depressed, a sixty-first step m61 determines whether or not the total display instruction key 60 is depressed. If the total display instruction key 60 is not depressed, then the program goes back to the step m59. If depressed, then the first section code and the corresponding total copy count therefor are displayed in a sixty-second step m62. A sixty-third step m63 ascertains whether the clear key 59 is depressed in a certain period of time, say about 2 seconds. If the clear key 59 is not depressed, then the program goes to a sixty-fourth step m64 which determines whether the section code is a final code or not. If not a final code, the section code is incremented by "1" in a sixty-fifth step m65, and then the program goes back to the step m59. The section codes and the total copy counts therefor are thus sequentially displayed.

When a section code to inhibit copying operations is displayed while the section codes and the total copy counts are being successively displayed, the clear key 59 is depressed. Then, the program goes from the step m63 to a sixty-sixth step m66 in which "bAn" is also displayed on the copy count display 56. In a next sixty-seventh step m67, the flag for the corresponding section code in the random-access memory RAM2 is set to "1". With the flag set to "1", any subsequent copying operation for that section is inhibited. Stated otherwise, the step m8 in FIG. 9(b) determines that there is an inhibit code for the section under consideration, thereby prohibiting the section from taking copies on the copying machine. After the step m67, the program returns to the step m59.

Accordingly, any coping operation in a desired section can be inhibited or banned as desired. When the section code is incremented up to a final code, the program proceeds from the step m64 to a sixty-eighth step m68 in which an end indication is displayed, and then the program returns back to the step m59.

When the select key 81 is found to be depressed in the step m60, the program goes back to the step m15 in which "CArd" is displaced on the copy count display 56 as shown in FIG. 10 at (2).

In order to clear the copying inhibition state in each section, the master checking magnetic card CB1 is employed to reset the flag in the random-access memory RAM2 through the procedure described with reference to FIG. 9(c) or 9(g). This allows all or desired sections to be freed from the copying inhibition state.

As an alternative, another supervising item may be provided such as a process for totalizing the total copy counts in all sections.

As a further alternative, successive display of the section codes and the total copy counts therefor can be speeded up by depressing the total display instruction key 60 continuously for more than a predetermined interval of time. This enables the total copy count in a desired section to be displayed in a short period of time.

While in the foregoing embodiments the present invention has been described and shown as being incorporated in an electrostatic copying machine, the present invention is also applicable to diazo copying machines.

Although certain preferred embodiments have been shown and described, it should be understood that many changes and modifications may be made therein without departing from the scope of the appended claims.

What is claimed is:

1. A card-operated copying machine comprising a processor responsive to information recorded on key checking cards assigned respectively to a plurality of sections for issuing signals capable of copying operation, memory means for storing total copy counts for the respective sections, display means for displaying the total copy count for each of said sections, said memory means having a flag indicative of permission and inhibition of copying operation for each of said sections, and an inhibition card recording thereon flag inhibition information for setting said flag to an inhibition state, said processor being capable of issuing a signal indicative of inhibition of copying operation in response to the key checking card for a section corresponding to a flag in the inhibition state.

2. A card-operated copying machine according to claim 1, including a total display instruction key for successively reading codes for sections and total copy counts therefor out of said memory means and for enabling said display means to display said codes and said total copy counts when the flag inhibition information recorded on said inhibition card is read out, and a clear key depressible when said display means displays a section to be prohibited from copying operation for setting the flag for a section to be prohibited to an inhibition state.

3. A card-operated copying machine according to claim 2, wherein said processor has a display data memory for temporarily storing the total copy counts from said memory means to allow said display means to display said codes and said total copy counts therefor, said processor being responsive to an output from said clear key for clearing the total copy counts in said display data memory to "0" when said key checking cards are used.

4. A card-operated copying machine according to any one of claims 2, including an all-section clearing card recording thereon information for clearing the total copy counts and flags for all of said sections, said processor being responsive to said all-section clearing card for clearing the total copy counts and flags for all of said sections in said memory means.

5. A card-operated copying machine according to any one of claims 2 including a section clearing card recording thereon information for clearing the total copy count and flag for each of said sections, said processors being responsive to depression of said clear key when a desired section is displayed on said display means while said codes and total copy counts therefor are being successively displayed by said total display instruction key with said section clearing card used, for thereby clearing the total copy count and flag for said desired section in said memory means.

6. A card-operated copying machine comprising a processor responsive to information recorded on key checking cards assigned respectively to a plurality of sections for issuing signals capable of copying operation, memory means for storing total copy counts for the respective sections, display means for displaying the total copy count for each of said sections, a master checking card for processing a plurality of supervising items, and a switch for selecting the supervising items, said processor being responsive to said master checking card for processing a supervising item selected by said switch.

7. A card-operating copying machine according to claim 6, including a printer controlled by said processor, said supervising items include a process for clearing the total copy counts for all of said sections, a process for automatically totaling the total copy counts for all of said sections, a process for manually totaling the total copy counts for desired sections, a process for printing a total of the total copy counts on said printer, a process for inhibiting copying operation in each of said sections or inhibiting copying operation in response to said key checking cards, and a process for clearing the total copy count and copying inhibition state for a desired section, said supervising items being successively selectable by said switch.

* * * * *